(12) United States Patent
White et al.

(10) Patent No.: US 11,621,662 B2
(45) Date of Patent: Apr. 4, 2023

(54) BATTERY AND MOTOR SYSTEM FOR REPLACING INTERNAL COMBUSTION ENGINE

(71) Applicant: BLACK & DECKER INC., New Britain, CT (US)

(72) Inventors: Daniel J. White, Baltimore, MD (US); Matthew J. Velderman, Baltimore, MD (US); Andrew E. Seman, Jr., Pylesville, MD (US); Ryan H. Peloquin, Ellicott City, MD (US); William A. Rigdon, Baltimore, MD (US); Harry X. Zhong, Lutherville, MD (US)

(73) Assignee: Black & Decker Inc., New Britain, CT (US)

( * ) Notice: Subject to any disclaimer, the term of this patent is extended or adjusted under 35 U.S.C. 154(b) by 368 days.

(21) Appl. No.: 16/376,328

(22) Filed: Apr. 5, 2019

(65) Prior Publication Data

US 2019/0238083 A1 Aug. 1, 2019

Related U.S. Application Data

(63) Continuation of application No. PCT/US2017/054857, filed on Oct. 3, 2017.
(Continued)

(51) Int. Cl.
*H02P 1/00* (2006.01)
*H02P 29/40* (2016.01)
(Continued)

(52) U.S. Cl.
CPC ............... *H02P 29/40* (2016.02); *B60L 3/06* (2013.01); *B60L 3/08* (2013.01);
(Continued)

(58) Field of Classification Search
CPC ... B60L 1/003; B60L 3/06; B60L 3/08; B60Y 2400/60; H01M 16/006; H01M 2220/30;
(Continued)

(56) References Cited

U.S. PATENT DOCUMENTS 2,011,023 A 8/1935 Townsend
2,294,153 A 8/1942 Alvord
(Continued)

FOREIGN PATENT DOCUMENTS

DE 102010006500 A1 8/2011
GB 1353704 A 5/1974
(Continued)

OTHER PUBLICATIONS

International Search Report and Written Opinion for PCT Application No. PCT/US17/54857 dated Jan. 26, 2018, 10 pages.
(Continued)

*Primary Examiner* — Kawing Chan
*Assistant Examiner* — Gabriel Agared
(74) *Attorney, Agent, or Firm* — Scott B. Markow

(57) ABSTRACT

A battery-powered motor may include an electric motor, a controller, and a housing. The electric motor may be wound to enable the battery-powered motor to achieve a non-limited motor maximum motor revolutions per minute (RPM) for at least one specified battery. The controlling current may include limiting current to the electric motor at lower RPMs, and limiting the current to prevent the RPM of the electric motor from exceeding a limited maximum motor RPM which is lower than the non-limited motor maximum RPM. The housing may enclose the electric motor and the controller and the specified battery. The housing may have a form factor to engage with a machine that engages with an
(Continued)

internal combustion engine that has a maximum engine RPM that is approximately the same as the limited maximum motor RPM.

17 Claims, 15 Drawing Sheets

Related U.S. Application Data

(60) Provisional application No. 62/404,999, filed on Oct. 6, 2016, provisional application No. 62/405,118, filed on Oct. 6, 2016.

(51) Int. Cl.
| | |
|---|---|
| *B60L 3/06* | (2006.01) |
| *B60L 3/08* | (2006.01) |
| *H01M 8/04858* | (2016.01) |
| *H01M 16/00* | (2006.01) |
| *H02J 7/34* | (2006.01) |
| *H01M 50/20* | (2021.01) |
| *H01M 50/543* | (2021.01) |
| *B60L 1/00* | (2006.01) |

(52) U.S. Cl.
CPC ..... *H01M 8/04947* (2013.01); *H01M 16/006* (2013.01); *H01M 50/20* (2021.01); *H01M 50/543* (2021.01); *H02J 7/34* (2013.01); *B60L 1/003* (2013.01); *B60Y 2400/60* (2013.01); *H01M 2220/30* (2013.01)

(58) Field of Classification Search
CPC .. H01M 2/1022; H01M 2/30; H01M 8/04947; H02J 7/34; H02P 29/40
USPC ........................................................ 318/139
See application file for complete search history.

(56) References Cited

U.S. PATENT DOCUMENTS

| | | | |
|---|---|---|---|
| 2,769,883 A | 11/1956 | Eckert et al. | |
| 3,040,590 A | 6/1962 | Smithburn | |
| 3,180,134 A | 4/1965 | Wadlington | |
| 3,435,289 A | 3/1969 | Aselman | |
| 3,443,115 A | 5/1969 | Timmerman | |
| RE27,393 E | 6/1972 | Aselman, Jr. | |
| 4,145,864 A | 3/1979 | Brewster, Jr. | |
| 4,420,787 A | 12/1983 | Tibbits et al. | |
| 4,527,751 A | 7/1985 | Grosz et al. | |
| 4,703,387 A | 10/1987 | Miller | |
| 4,713,303 A | 12/1987 | Farooque et al. | |
| 4,823,067 A | 4/1989 | Weber | |
| 4,848,961 A | 7/1989 | Rouillard | |
| 4,861,188 A | 8/1989 | Rouillard et al. | |
| 4,931,947 A | 6/1990 | Werth et al. | |
| 4,961,151 A | 10/1990 | Early et al. | |
| 4,962,462 A | 10/1990 | Fekeie | |
| 5,013,990 A | 5/1991 | Weber | |
| RE33,874 E | 4/1992 | Miller | |
| 5,177,371 A | 1/1993 | Faulk | |
| 5,244,351 A | 9/1993 | Arnette | |
| 5,325,035 A | 6/1994 | Chiu | |
| 5,332,630 A | 7/1994 | Hsu | |
| 5,426,995 A | 6/1995 | Maennle | |
| D375,963 S | 11/1996 | Braun et al. | |
| 5,583,416 A | 12/1996 | Klang | |
| 5,623,596 A | 4/1997 | Townsley et al. | |
| 5,725,304 A | 3/1998 | Inai | |
| 5,739,596 A | 4/1998 | Takizawa et al. | |
| 5,787,693 A * | 8/1998 | Dyke .................... | A01B 33/08 56/11.9 |
| 5,820,350 A | 10/1998 | Mantey et al. | |
| 5,833,437 A | 11/1998 | Kurth et al. | |
| 5,858,568 A | 1/1999 | Hsu et al. | |
| 6,139,217 A | 10/2000 | Reuter | |
| 6,202,171 B1 | 3/2001 | Townsley et al. | |
| 6,263,979 B1 | 7/2001 | Dyke et al. | |
| 6,288,521 B1 | 9/2001 | Meador | |
| 6,296,467 B1 | 10/2001 | Rouillard | |
| 6,380,637 B1 | 4/2002 | Hsu et al. | |
| 6,468,682 B1 | 10/2002 | Fuglevand et al. | |
| 6,492,056 B1 | 12/2002 | Ovshinsky | |
| 6,649,289 B2 | 11/2003 | Hsu et al. | |
| 6,743,536 B2 | 6/2004 | Fuglevand | |
| 6,875,536 B2 | 4/2005 | Ovshinsky | |
| 6,922,981 B1 | 8/2005 | Tyree | |
| 6,928,353 B2 | 8/2005 | Finley et al. | |
| 7,226,675 B2 | 6/2007 | Ovshinsky et al. | |
| 7,326,480 B2 | 2/2008 | Fuglevand | |
| 7,539,570 B2 | 5/2009 | Normann | |
| 7,543,434 B2 | 6/2009 | Jackson et al. | |
| 7,621,194 B1 | 11/2009 | Tyree | |
| 7,738,979 B2 | 6/2010 | Schmuck et al. | |
| 7,856,714 B2 | 12/2010 | Hyde et al. | |
| 8,281,425 B2 | 10/2012 | Cohen | |
| 8,490,732 B2 | 7/2013 | Sugimoto et al. | |
| 8,723,052 B1 | 5/2014 | Sullivan et al. | |
| 8,732,992 B2 | 5/2014 | Hartwick et al. | |
| 8,736,133 B1 | 5/2014 | Smith et al. | |
| 8,785,784 B1 | 7/2014 | Duford et al. | |
| 8,893,937 B1 * | 11/2014 | Bristol .................... | A45F 3/04 224/153 |
| 8,991,514 B2 | 3/2015 | Tozawa et al. | |
| 9,030,040 B2 | 5/2015 | Tarasinski et al. | |
| 9,063,530 B2 | 6/2015 | Lougheed et al. | |
| 9,211,577 B2 | 12/2015 | Adolphy et al. | |
| 2002/0024886 A1 | 2/2002 | Sherez | |
| 2002/0079853 A1 * | 6/2002 | Schmitz ................ | B60L 58/15 318/434 |
| 2003/0027468 A1 * | 2/2003 | Into ........................ | B63H 21/22 440/84 |
| 2003/0144774 A1 * | 7/2003 | Trissel .................. | A01D 34/008 701/23 |
| 2003/0207156 A1 | 11/2003 | Ovshinsky et al. | |
| 2005/0048335 A1 | 3/2005 | Fields et al. | |
| 2005/0158121 A1 | 7/2005 | Lindley | |
| 2005/0158176 A1 | 7/2005 | Yiu et al. | |
| 2006/0018712 A1 * | 1/2006 | Rouillard .............. | E04F 21/242 404/114 |
| 2006/0202584 A1 | 9/2006 | Jore et al. | |
| 2007/0120366 A1 | 5/2007 | Grant et al. | |
| 2007/0152630 A1 | 7/2007 | Winkler et al. | |
| 2008/0120955 A1 | 5/2008 | Lucas et al. | |
| 2008/0253221 A1 | 10/2008 | Lindley | |
| 2009/0188361 A1 | 7/2009 | Simpson et al. | |
| 2009/0251007 A1 | 10/2009 | Adams et al. | |
| 2009/0288893 A1 * | 11/2009 | Wyall ...................... | B60K 6/26 180/65.22 |
| 2010/0058726 A1 | 3/2010 | Notaras et al. | |
| 2011/0115436 A1 | 5/2011 | Zhang et al. | |
| 2011/0273048 A1 | 11/2011 | Jore et al. | |
| 2012/0017558 A1 | 1/2012 | Pellenc | |
| 2012/0071066 A1 | 3/2012 | Banchio | |
| 2012/0217831 A1 | 8/2012 | Jore et al. | |
| 2012/0256568 A1 | 10/2012 | Lee | |
| 2012/0262019 A1 | 10/2012 | Smith et al. | |
| 2012/0318600 A1 | 12/2012 | Hakamata et al. | |
| 2013/0036727 A1 * | 2/2013 | Heichel ................ | E02D 7/18 60/327 |
| 2013/0076147 A1 | 3/2013 | Sun et al. | |
| 2013/0180495 A1 * | 7/2013 | Veerathappa ........... | F02B 67/04 123/195 A |
| 2013/0269655 A1 * | 10/2013 | Yamazaki ............... | F02D 11/04 123/403 |
| 2014/0028149 A1 | 1/2014 | Oyague | |
| 2014/0042868 A1 | 2/2014 | Sullivan et al. | |
| 2014/0096581 A1 | 4/2014 | Yakush et al. | |
| 2014/0152136 A1 | 6/2014 | Duford et al. | |
| 2014/0175871 A1 * | 6/2014 | Kim ........................ | B60L 58/40 307/10.1 |
| 2014/0241105 A1 | 8/2014 | Jin | |

(56) References Cited

U.S. PATENT DOCUMENTS

| | | | |
|---|---|---|---|
| 2014/0262499 A1 | 9/2014 | Smith et al. | |
| 2014/0268460 A1 | 9/2014 | Banerjee et al. | |
| 2015/0003135 A1 | 1/2015 | Chen et al. | |
| 2015/0022040 A1 | 1/2015 | Mikowychok | |
| 2015/0061413 A1 | 3/2015 | Janarthanam et al. | |
| 2015/0084606 A1 | 3/2015 | Nakamura et al. | |
| 2015/0171632 A1 | 6/2015 | Fry et al. | |
| 2015/0188375 A1 | 7/2015 | Sullivan et al. | |
| 2015/0188391 A1 | 7/2015 | Carron et al. | |
| 2015/0207431 A1 | 7/2015 | Brotto et al. | |
| 2015/0231975 A1* | 8/2015 | Ishii .................. | B60L 50/51 307/10.1 |
| 2015/0288041 A1 | 10/2015 | Forte | |
| 2015/0311756 A1 | 10/2015 | Sullivan | |
| 2015/0318751 A1 | 11/2015 | Smith et al. | |
| 2016/0007525 A1 | 1/2016 | Drew et al. | |
| 2016/0020443 A1 | 1/2016 | White et al. | |
| 2016/0218381 A1 | 7/2016 | Forte | |

FOREIGN PATENT DOCUMENTS

| | | | |
|---|---|---|---|
| JP | 2006247439 A | 9/2006 |
| WO | 9102845 A1 | 3/1991 |
| WO | 2013043117 A1 | 3/2013 |
| WO | 2015134855 A1 | 9/2015 |

OTHER PUBLICATIONS

International Search Report and Written Opinion for PCT Application No. PCT/US17/55619 dated Dec. 11, 2017, 7 pages.

\* cited by examiner

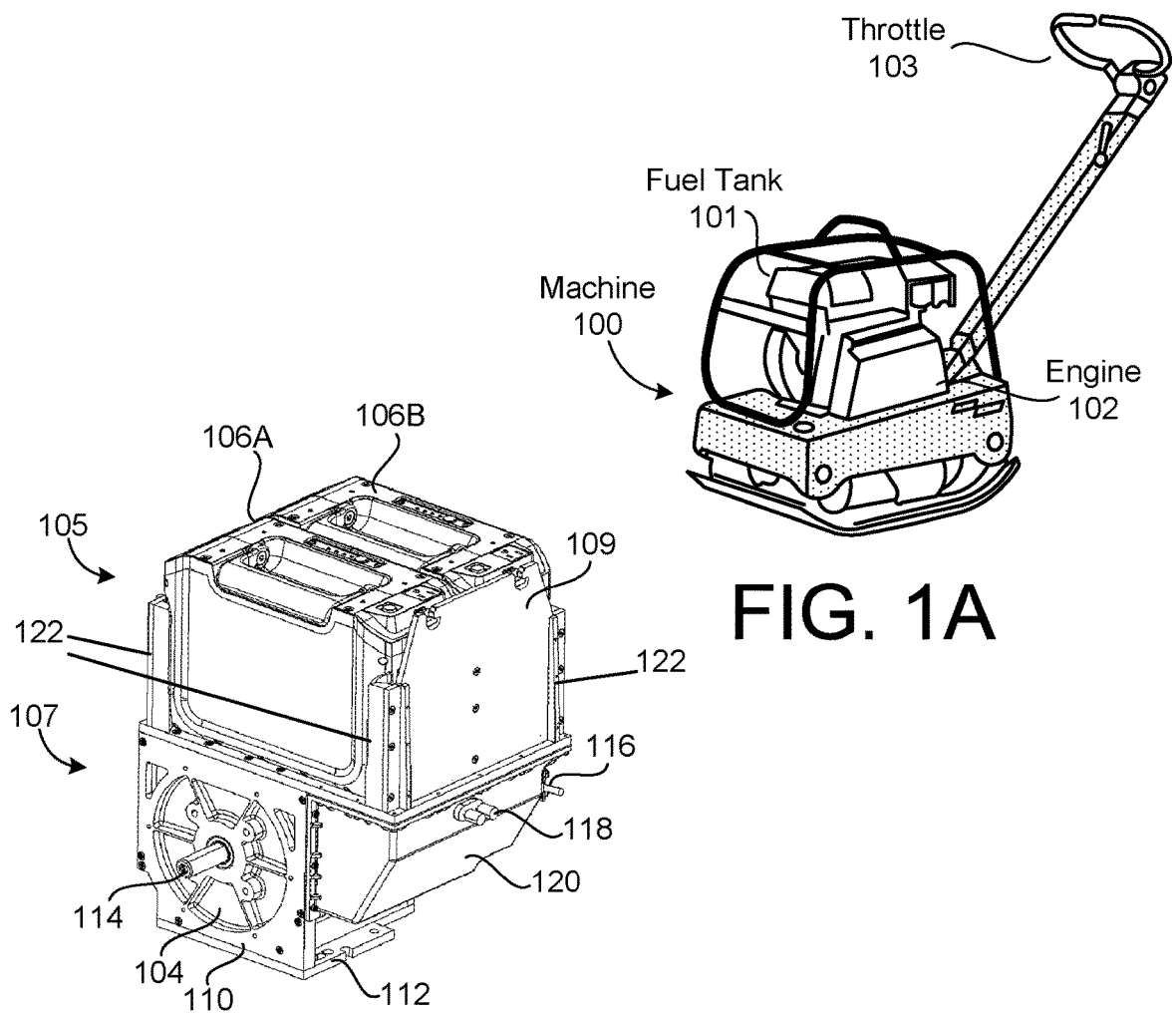
FIG. 1A
FIG. 1B
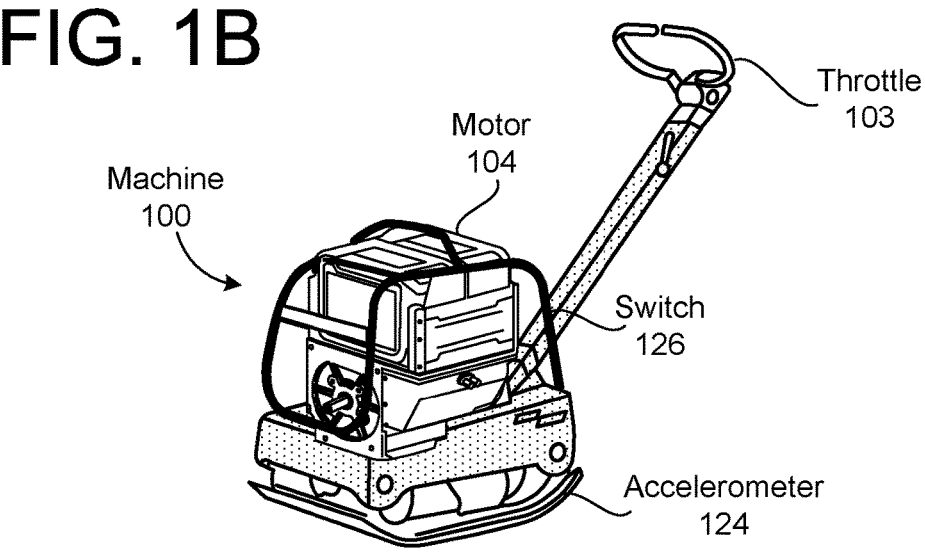
FIG. 1C and # BATTERY AND MOTOR SYSTEM FOR REPLACING INTERNAL COMBUSTION ENGINE

CROSS-REFERENCE TO RELATED APPLICATIONS

This application is a continuation of PCT Application No. PCT/US2017/054857, filed Oct. 3, 2017, entitled "BATTERY AND MOTOR SYSTEM FOR REPLACING INTERNAL COMBUSTION ENGINE," which claims priority to U.S. Provisional Application No. 62/405,118, filed on Oct. 6, 2016, entitled, "BATTERY AND MOTOR SYSTEM FOR REPLACING INTERNAL COMBUSTION ENGINE," and U.S. Provisional Application No. 62/404,999, filed on Oct. 6, 2016, entitled "BATTERY PACK, POWER TOOL AND BATTERY PACK CHARGER SYSTEM."

TECHNICAL FIELD

This description relates to batteries and electric motors.

BACKGROUND

FIG. 1A shows a machine 100 with an internal combustion engine 102. The machine 100 may include equipment and vehicles, such as a concrete trowel or power trowel, a lawnmower, a pressure washer, a tiller, or a water pump, as non-limiting examples. The machine 100 may be powered by the internal combustion engine 102, which may include an output shaft (not shown) that drives rotating components of the machine 100, causing the machine 100 to produce work and perform functions such as rotating blades, driving a compressor, or driving a pump. The engine 102 may have a maximum engine revolutions per minute (RPM), which is a maximum speed at which the engine 102 can operate. In an example in which the engine 102 is a four-stroke internal combustion engine, the maximum engine RPM may be 3,600 RPM. The engine 102 is coupled to a fuel tank 101 that provides a reservoir of fuel (e.g., gasoline) for powering the engine 102.

The machine 100 may include a throttle 103. The throttle 103 may control an amount of gasoline consumed by the internal combustion engine 102. By controlling the amount of gasoline consumed by the internal combustion engine 102, the throttle 103 may control the speed, power, and/or torque generated by the internal combustion engine 102, which may control the work output of the machine 100 such as the rate of impact, and impact force of the tamper plate included in the machine 100 (which may be measured as RPM).

SUMMARY

According to one example, a battery-powered motor may include an electric motor, a controller, and a housing. The electric motor may be wound to enable the battery-powered motor to achieve a non-limited motor maximum motor revolutions per minute (RPM) for at least one specified battery. The controller may be configured to control current flowing from the at least one specified battery to the electric motor. The controlling current may include limiting current to the electric motor at lower RPMs, and limiting the current to prevent the RPM of the electric motor from exceeding a limited maximum motor RPM, the limited maximum motor RPM being lower than the non-limited motor maximum RPM. The housing may enclose the electric motor and the controller and the at least one specified battery. The housing may have a form factor configured to engage with a machine that engages with an internal combustion engine that has a maximum engine RPM that is approximately the same as the limited maximum motor RPM.

According to another example, a machine may include a rotating component, an electric motor including a spindle configured to cause the rotating component to rotate, and a throttle control configured to provide input to the electric motor, the throttle control comprising a cable with slack, the slack being configured to cause the throttle to provide no input to the electric motor during a first portion of a range of motion of the throttle.

According to another example, an electric motor may include an electric motor, a controller configured to, in response to receiving a signal indicating a low hydraulic pressure condition in a machine powered by the motor, reduce power to the electric motor, and a housing enclosing the electric motor and the controller.

According to another example, an electric motor assembly may include an electric motor, a rechargeable battery coupled to the electric motor, a fuel cell coupled to the electric motor in parallel with the rechargeable battery; and a controller configured to control current flowing from the rechargeable battery and the fuel cell to the electric motor such that the fuel cell is operable to maintain or increase a state of charge of the battery while the battery is powering the motor.

The details of one or more implementations are set forth in the accompanying drawings and the description below. Other features will be apparent from the description and drawings, and from the claims.

BRIEF DESCRIPTION OF THE DRAWINGS

FIG. 1A shows a machine with an internal combustion engine according to an example embodiment.

FIG. 1B shows a battery and motor system according to an example embodiment.

FIG. 1C shows the machine of FIG. 1A with the internal combustion engine replaced with the battery and motor system of FIG. 1B according to an example embodiment.

DETAILED DESCRIPTION

Figure 1D:
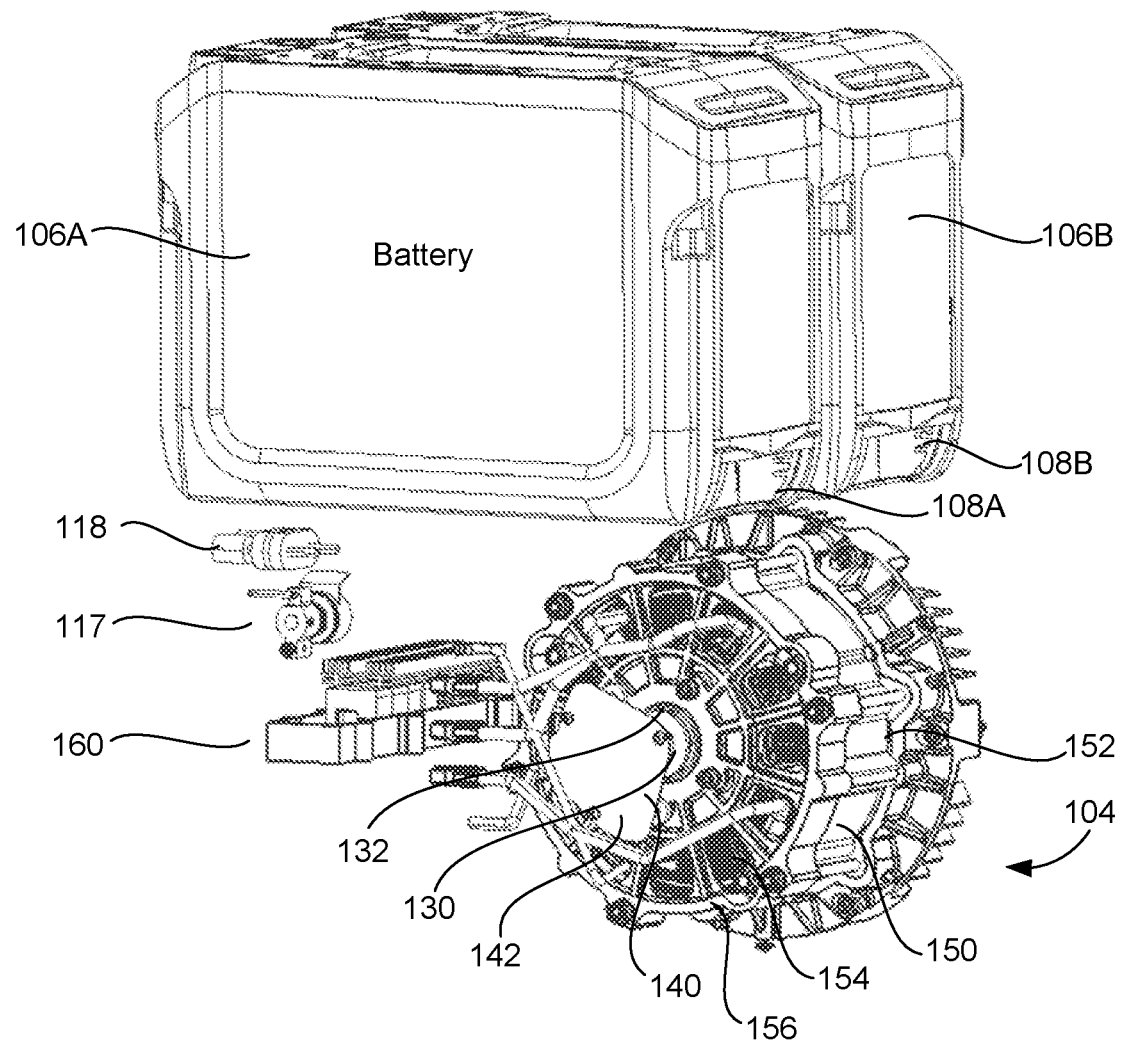
FIG. 1D is an exploded view of the battery and motor system of FIG. 1B.

Referring to FIG. 1B, in an example embodiment, a battery and motor system 105 is configured to replace the internal combustion engine 102 in the machine 100 to produce work. The motor system 105 may also be considered an electric motor system. The system 105 includes a housing 107 that includes a battery receptacle 109 for one or more batteries, a motor housing 110, and a control box 120. The battery receptacle 109 includes rail guides 122 and latch receivers (not labeled in FIG. 1B), and is configured to receive a first battery pack 106A and/or a second battery pack 106B. The rail guides 122 may guide placement of the battery packs 106A, 106B into the receptacle 109. The rail guides 122 and latch receivers may also secure the battery packs 106A, 106B within the receptacle. The motor housing 110 is configured to receive a motor 104 with an output shaft or spindle 114. The control box 120 is configured to receive control electronics 160 (shown in FIG. 1E) for controlling power delivery to the motor 104 and inputs 117 (shown in FIG. 1D).

Referring also to FIG. 1C, the housing 107, battery packs 106A, 106B, motor 104, and control box 120 are arranged and configured so that the overall envelope is substantially similar to the internal combustion engine 102 and fuel tank 101 that the system 105 is intended to replace. For example, these components together may have substantially similar overall size and outer dimensions as the engine 102. In addition, a bottom of the motor housing 110 may be considered a base 112. The base 112 may be flat, with mounting features substantially similar to the internal combustion engine for securing the bottom of the motor housing 110 to the machine 100, as shown in FIG. 1C. Further, the output shaft or spindle 114 may have the same configuration as the output shaft of the engine 102.

FIG. 1C shows the machine 100 of FIG. 1A with the internal combustion engine 102 replaced with the battery-powered motor 104 of FIG. 1B according to an example embodiment. At the locations of the motor 104 where the motor 104 interfaces with and/or engages the machine 100, the motor 104 may have a same form factor as the internal combustion engine 102, allowing a user, operator of the machine 100, or equipment manufacturer to elect to install and use an internal combustion engine 102 or install and use the battery-powered motor 104 with the machine 100.

The motor 104 may draw power from one or more battery packs, with the motor 104 designed to operate according to the rated voltage of the battery packs. In the example shown in FIG. 1B, the motor 104 draws power from a first battery pack 106A and/or a second battery pack 106B. The first battery pack 106A and second battery pack 106B may include rechargeable battery cells, such as lithium-ion, nickel cadmium, or nickel metal hydride battery cells. In an example implementation, the first battery pack 106A, and/or the second battery pack 106B may have features of the battery packs described in U.S. Provisional Application No. 62/404,999, filed on Oct. 6, 2016, entitled, "BATTERY PACK, POWER TOOL AND BATTERY PACK CHARGER SYSTEM," which is hereby incorporated by reference in its entirety.

Figure 1E:
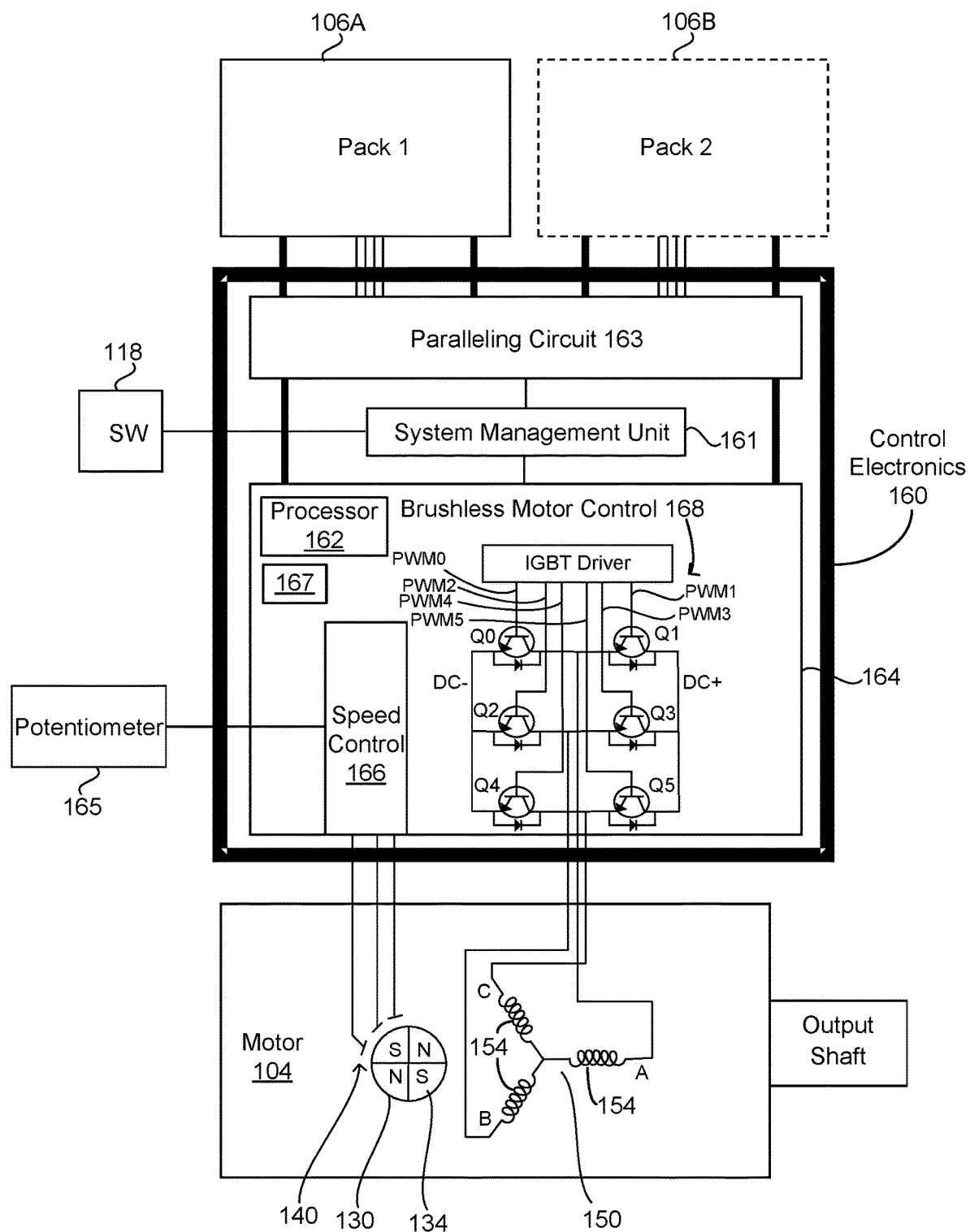
FIG. 1E is a block diagram of the battery and motor system of FIG. 1B according to an example embodiment.

Referring also to FIG. 1E, the first battery pack 106A and second battery pack 106B may be connected to the motor 104 in parallel, so that the motor 104 may draw power from either or both the first battery pack 106A and the second battery pack 106B. The connecting of the first battery pack 106A and second battery pack 106B to the motor 104 in parallel may allow the battery packs 106A, 106B to be hot-swapped, removing and replacing one battery pack (such as the first battery pack 106A) while the motor 104 is running and drawing power from the other battery pack (such as the second battery pack 106B). This parallel connection also enables the motor 104 to be powered by only one of the battery packs 106A, 106B. Further, because they are connected in parallel, the battery packs 106A, 106B will tend to balance or equilibrate to have the same voltage if one of the battery packs initially has a different voltage than the other battery pack. In practice, the parallel implementation of the connecting the first battery pack 106A and second battery pack 106B may employ an electronic circuit for paralleling the batteries, principally the use of diodes and/or selective power switching via a systems control unit.

In an example embodiment (shown in FIG. 1D), the battery packs 106A, 106B may each include a discharging/charging port 108A, 108B for providing/receiving direct current (DC). The port 108A, 108B may include an interface configured to mechanically and electrically coupling to an electrical device such as a battery powered device such as a motor system 105 or a power tool or to a battery pack charger. The interface includes a plurality of terminals configured to mechanically mate with corresponding terminals of the coupled device and for providing/receiving electrical power and signals to/from the coupled device, for example, with corresponding terminals (not shown) in the battery receptacle 109. For example, the battery packs 106A, 106B may have female terminals that receive the male terminals of the battery receptacle 109. Alternatively, the battery packs 106A, 106B may have a combination of male and female terminals that mate with a corresponding set of female and male terminals of the battery receptacle 109. In addition, the battery packs 106A, 106B may optionally have alternating current (AC) output terminals (not labeled) that provide AC power out to an AC tool or appliance with a standard AC plug connector. The AC terminals and the DC terminals may be operable at the same time or alternately, as further described in the aforementioned U.S. Provisional Application No. 62/404,999, filed on Oct. 6, 2016.

The motor housing 110 may enclose components of the motor 104, which may, for example, be a brushless direct current (DC) motor, brushed DC motor, universal AC motor, induction motor. In an exemplary embodiment shown in FIG. 1E, the brushless motor 104 includes a speed sensing electronic assembly 140, a stator assembly 150, a rotor assembly 130, having a rotor 130 (shown in FIGS. 1D and 1E) and a stator 150 (shown in FIGS. 1D and 1E). The rotor assembly 130 includes a rotor 132 having a plurality of permanent magnets 134 (shown in FIG. 1E). The speed sensing electronic assembly 140 includes a circuit board 142 with a plurality of Hall effect sensors arranged around the circumference of rotor 132.

The stator assembly 150 includes a stator 152 (shown in FIG. 1D) having a plurality of stator windings or coils 154 housed in a stator lamination stack 156, with each stator wound around a tooth. In a three-phase brushless electric motor, as shown in this exemplary embodiment, three stator windings or coils 154 are provided within the lamination stack 156. Each stator winding and/or coils 154 is distributed around the lamination stack 156 to form an even number of poles. The stator windings or coils 154 may be connected in a variety of configurations, such as series delta configuration, a parallel delta configuration, a series wye configuration, and a parallel wye configuration. Based on the input from the speed sensing electronic circuit, the control electronics 160 sequentially commutate the stator windings to drive the rotor 132. In one embodiment, the configuration of the motor 104 may be similar to the brushless motor disclosed in U.S. Pat. No. 9,450,472, which is incorporated by reference.

The strength of the magnetic fields generated by the coils 154, which may determine the torque and/or power generated by the motor 104, may be based on the current flowing through the coils 154, and the number of turns and/or times each wire is wound around the wire's respective tooth. A manufacturer of the motor 104 may determine a maximum speed, torque, and power for the motor 104 for a given voltage, current rate capability, and power rating of the batteries 106A, 106B by selecting a wiring configuration. The maximum power and/or torque generated by the motor 104 may be associated with a non-limited motor RPM, which may be a non-limited maximum motor RPM of the motor 104.

The rotor 132 drives the output spindle 114, which may connect to the machine 100 either directly or through a transmission. When the motor 104 is installed onto the machine 100, the spindle 114 may extend into components of the machine 100 to power the machine 100. The spindle 114 may extend from the rotor 130 (shown in FIG. 1D) through the motor housing 110, and may be partially enclosed by the motor housing 110.

Referring to FIG. 1B, the control box 120 may include a lever 116. The lever 116, which may be considered a throttle input lever, may receive input from the throttle 103 of the machine 100. As shown in more detail in FIG. 1E, the lever 116 may be coupled to a potentiometer 165 (shown in FIG. 1E) to provide input to the control electronics 160, to control the speed, torque, and power delivered by the motor 104 based on the position of the lever 116.

The control box 120 also may include a switch 118. The switch 118, which may be considered an on/off switch, may provide input to the control electronics 160, to reduce or disconnect power delivered to the motor 104. The switch 118 may receive input from the machine 100 via a user or operator of the machine 100, such as via pressure applied to a switch 126 (shown in FIG. 1C) of the machine 100, to immediately turn the motor 104 off.

The control box 120 encloses the control electronics 160 for controlling the motor 104 based on input from the lever 116 and switch 118. The control box 120 may also enclose wires that are coupled to both the coils 154 (shown in FIG. 1E) of the stator 150 and the outputs 108A, 108B of the batteries 106A, 106B. In an example embodiment, the control box 120 may be considered a part of the housing 110.

The user or operator of the machine 100 may control the motor 104 by applying pressure to the throttle 103, which pressure may translate, by levers, cables, and/or pulleys to operate the lever 116 and provide input to the control electronics 160 (shown in FIG. 1F). The machine 100 may include an accelerometer 124 (shown in FIG. 1C) that provides operational feedback to the control electronics 160. The machine 100 may also include a switch 126. The switch 126 may receive pressure from the user or operator to turn off the motor 104, and translate the pressure to close the switch 118 (shown in FIG. 1B), which in turn may provide input to the control electronics 160 to turn off the motor 104.

FIG. 1E shows control electronics 160 that may be included in the system 105 of FIG. 1B according to an example embodiment. The control electronics 160, which may also be considered a controller, may control functions of the motor 104, such as whether the motor 104 turns on or off, and/or an amount of speed, torque, and power generated by the motor 104. The control electronics 160 may provide output at the brushless motor control circuit 168, such as controlling an amount of power that flows from the battery packs 106A, 106B through the coils 154 of the stator 150, based on received input at the speed control unit 166, such as positions of the lever 116 and/or switch 118, and/or input from the accelerometer 124 or other transducers such as a hydraulic pressure sensor.

The control electronics 160 include a paralleling circuit 163 configured to connect two or more battery packs 106A, 106B in parallel. The control electronics 162 may also include a system management unit 161 that is connected to the switch 118. In addition, the control electronics 160 may include a motor control unit 164 that includes a speed control unit 166 coupled to the motors speed sensing assembly 140, and a brushless motor control circuit 168 coupled to the stator assembly of the brushless motor 104. An exemplary brushless motor control circuit 168 is disclosed in U.S. Pat. No. 9,154,009, which is incorporated by reference. The control electronics 160 may be embodied in one or more controllers, processors, microprocessors, or electronic circuits. The control electronics 160 may include a controller or processor 162 that executes instructions to set the voltage and current flowing through the coils 154, based on the received inputs. The controller or processor 162 may execute instructions stored in memory to perform any combination of functions, methods, and/or techniques described herein. The control electronics 160 may include a memory device 167, which may store instructions for the at least one controller or processor. The memory device 167 may include at least one non-transitory computer-readable storage medium comprising instructions stored thereon that, when executed by the at least one processor, are configured to cause the motor 104 to perform any combination of the functions, methods, and/or techniques described herein.

Figure 2A:
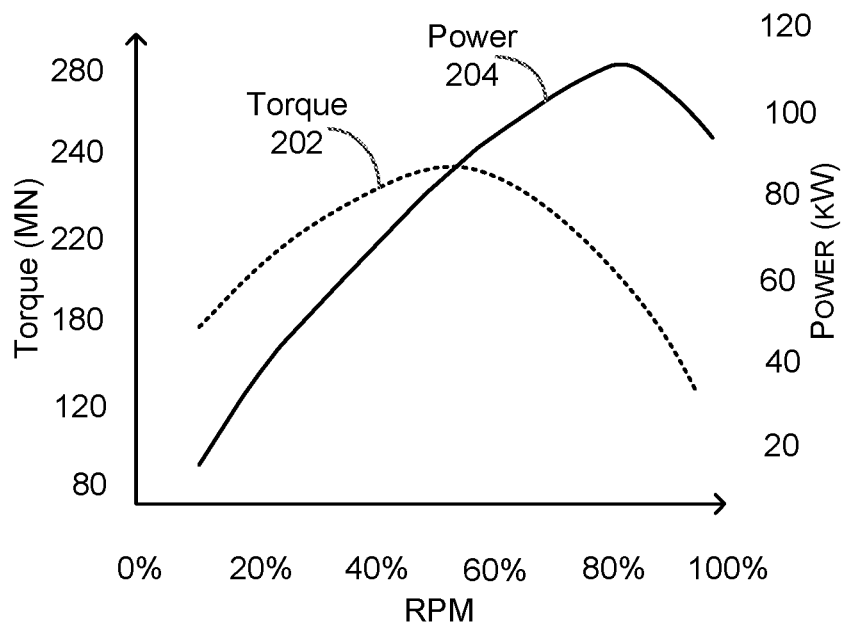
FIG. 2A is a graph showing the typical torque and power of an internal combustion engine as functions of revolutions per minute (RPM) in the internal combustion engine of FIG. 1A according to an example embodiment.

FIG. 2A is a graph showing typical torque 202 and power 204 as functions of engine speed in revolutions per minute (RPM) for an internal combustion engine, such as the engine 102 of FIG. 1A. As shown in FIG. 2A, torque 202 increases as RPM increases until about fifty percent (50%) of maximum RPM, at which point torque 202 reaches a maximum and begins to decrease as RPM increases. Also as shown in FIG. 2A, power 204 increases as RPM increases until about eighty-five percent (85%) of maximum RPM, at which point power 204 reaches a maximum and begins to decrease as RPM increases.

Figure 2B:
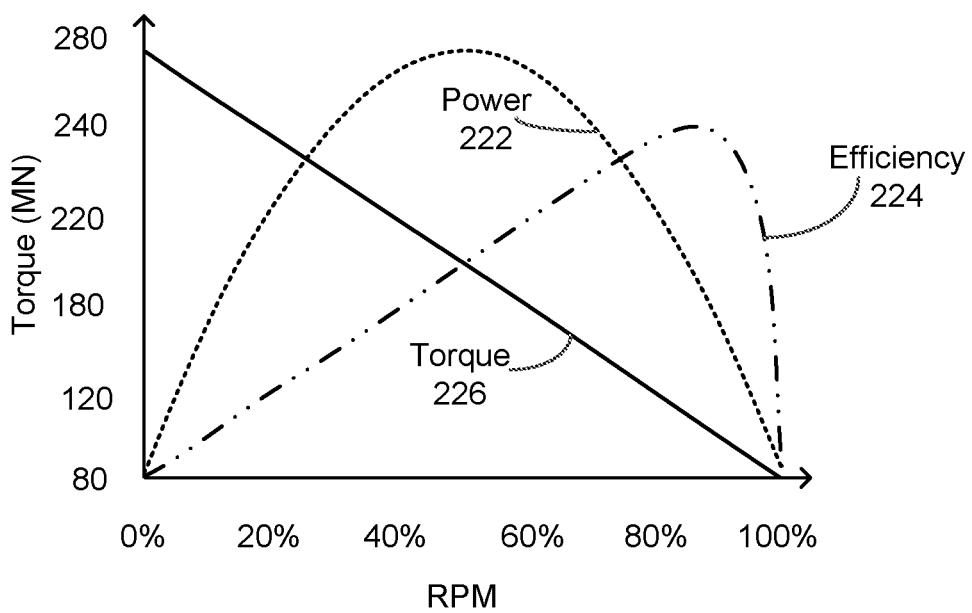
FIG. 2B is a graph showing the typical power, torque, and efficiency of a brushless motor as functions of RPM.

FIG. 2B is a graph showing typical power 222, torque 226, and efficiency 224 as functions of motor speed (in RPM) for a typical electric DC motor. The efficiency 224 indicates the percentage of input power drawn from a power supply that is converted into output rotational power. In this example, the motor 104 may have a same maximum RPM, non-limited motor maximum RPM, and/or predetermined motor maximum RPM as the maximum engine RPM of the internal combustion engine 102 that the motor 104 is designed to replace in the machine 100. In an example in which the internal combustion engine 102 is a four-stroke internal combustion engine with a maximum engine RPM of 3,600, the RPM percentages in both FIGS. 2A and 2B may indicate percentages of this maximum value. Fifty percent (50%) RPM may therefore mean 1,800 RPM, for example.

As shown in FIG. 2B, the torque 226, power 222, and efficiency of a typical motor respond differently to changes in RPM than the torque 202, power 204, and efficiency of the internal combustion engine 102. For example, the power 222 of the motor reaches a peak at fifty percent (50%) of maximum RPM rather than at eighty-five percent (85%) RPM for the internal combustion engine 102, and the torque 226 of the motor 104 declines linearly as a function of RPM at all RPM in the motor 104, rather than reaching a maximum at fifty percent (50%) RPM as in the internal combustion engine 102. If a motor with the torque 226 and power 222 response to RPM shown in FIG. 2B were installed into a machine 100 designed for an internal combustion engine 102 with the torque 202 and power response to RPM shown in FIG. 2A, the increased torque 226 and power 222 at low RPM could damage components of the machine 100, reducing the life expectancy of the machine 100. The increased torque 226 and power 222 at low RPM in the motor 104 compared to the engine 102 could, for example, break a transmission of the machine 100. The shift in the speed at which maximum power occurs, being 85% RPM with the four-stroke internal combustion engine to 50% RPM with the electric DC motor, would also change the performance of the equipment such that it may no longer operate, or produce reduced work. Therefore, the present application discloses three techniques or modifications to modify the performance of the motor 104 to more closely emulate the performance of the internal combustion that the system 105 is intended to replace.

Figure 2C:
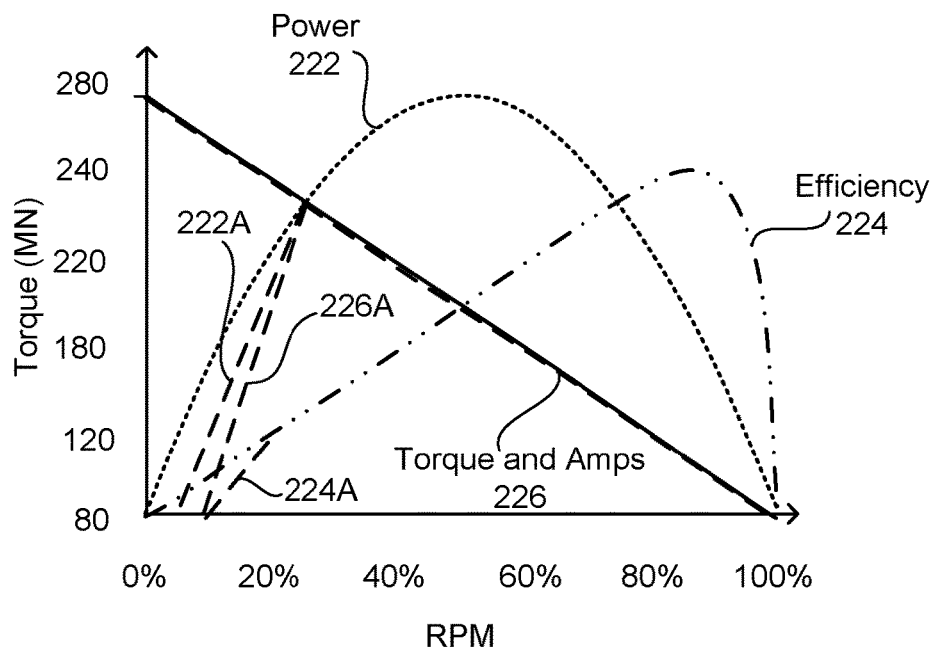
FIG. 2C is a graph showing a first modification to power, torque, and efficiency as functions of RPM in the motor of FIG. 1B.

The first modification is illustrated in FIG. 2C. FIG. 2C is a graph showing power 222, 222A, torque 226, 226A, and efficiency 224, 224A as functions of RPM in the battery-powered motor 104 of FIG. 1B. According to this example embodiment, torque 226A and power 222A are reduced at lower motor speeds (e.g., below 20% of maximum RPM) to simulate the performance of the internal combustion engine 102. In this example, the control electronics 160 (shown in FIG. 1E) may reduce torque and power in the motor 104 at low RPM from the solid lines 226, 222 to the dashed lines 226A, 222A. The control electronics 160 may reduce the torque and power at low RPM by, for example, reducing the current flowing through the coils 154 (shown in FIG. 1E) at low RPM. For example, the control electronics 160 may reduce the torque and power for at least a lowest five percent (5%), lowest ten percent (10%), lowest fifteen percent (15%), lowest twenty percent (20%), or lowest twenty-five percent (25%) of a range of RPMs for the motor 104. The reduced torque 226A at low RPM may reduce the damage to the machine 100, increasing the life expectancy of the machine 100 or protecting the machine and operator from failure.

Figure 2D:
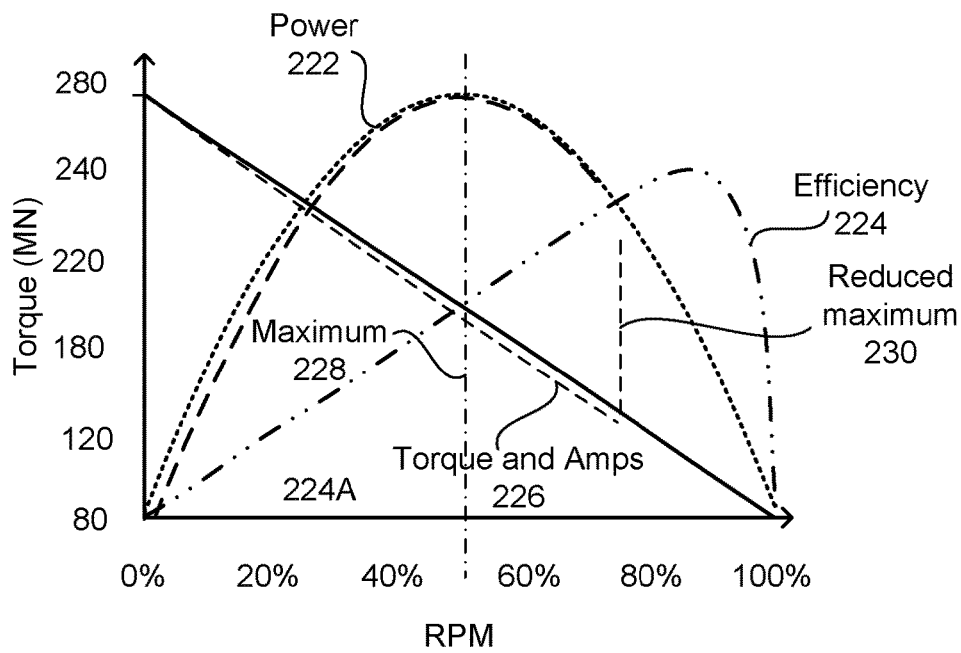
FIG. 2D is a graph showing a second modification to power, torque, and efficiency as functions of RPM in the motor of FIG. 1B.

The second modification is illustrated in FIG. 2D. FIG. 2D is a graph showing power 222, torque 226, and efficiency 226 as functions of RPM in the motor 104 of FIG. 1B according to an example embodiment in which the maximum power 230 and torque 226 are reduced to simulate performance of the internal combustion engine 102. In this example, the control electronics 160 may reduce the maximum power and/or speed of the motor 104, such as by reducing the current flowing through, and/or voltage supplied to, the coils 154, such as by performing pulse-width modulation (PWM) on the current and/or voltage supplied to the coils, with a reduced duty cycle to reduce the power and/or speed of the motor 104. For example the control electronics 160 may reduce the torque and power for at least a highest five percent (5%), highest ten percent (10%), highest fifteen percent (15%), highest twenty percent (20%), or highest twenty-five percent (25%) of a range of RPMs for the motor 104.

Figure 2E:
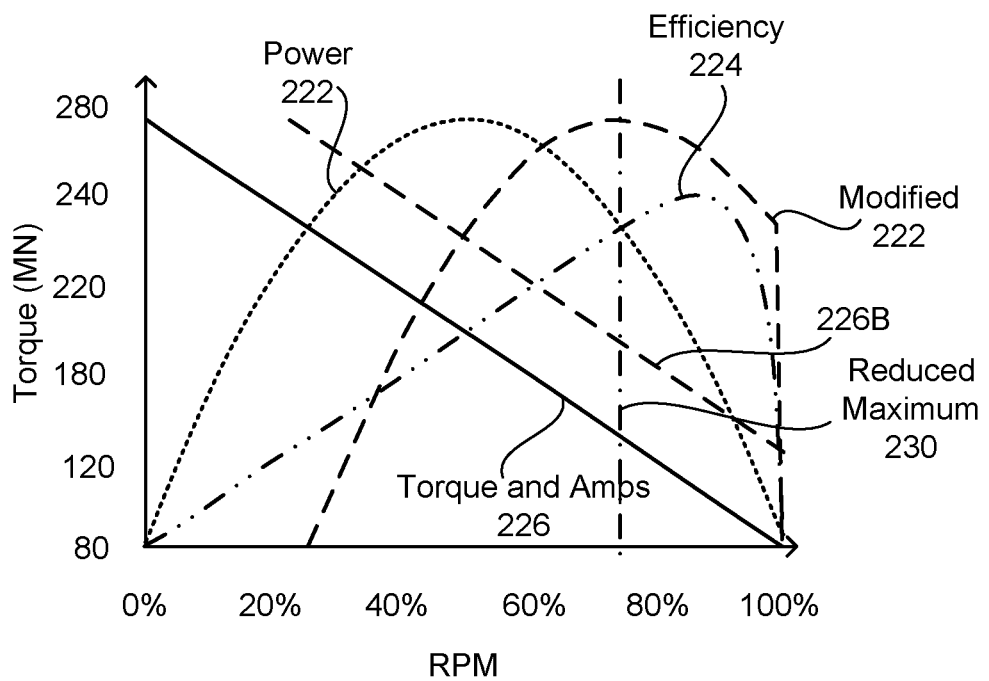
FIG. 2E is a graph showing a third modification to power, torque, and efficiency as functions of RPM in the motor of FIG. 1B.

The third modification is illustrated in FIG. 2E. FIG. 2E is a graph showing power 222, 222B, torque 226, 226B, and efficiency 224 as functions of RPM in the battery-powered motor 104 of FIG. 1B according to an example embodiment in which the non-limited maximum motor speed is higher than the maximum speed of the internal combustion engine that the motor replaces. The non-limited maximum motor speed of the electric motor is set by the winding pattern of the coils 154 such that the speed is beyond the maximum engine RPM of the internal combustion engine 102 that the motor 104 replaces. For example, in a motor 104 that replaces an internal combustion engine 102 with a maximum engine RPM of 3,600, the windings of the coils 154 may be increased so that the predetermined maximum motor RPM and/or non-limited maximum motor RPM of the motor 104 is one-third higher, 4,800. Next, the control electronics 160 electronically limit or clip the non-limited maximum motor output speed, such as by controlling current and/or limiting current to the electric motor, so that a limited maximum motor output speed of the motor 104 is less than the theoretical maximum motor speed dictated by the windings or coils. In the example shown in FIG. 2E, the control electronics 160 reduces and/or limits the maximum speed to a limited maximum motor RPM of seventy-five percent (75%) of the 4,800 non-limited motor maximum RPM, or 3,600. The power 222 is then maximized at fifty percent (50%) of the 4,800 non-limited motor maximum RPM, or 2,400, which is closer to the 3,060 maximum engine RPM at which power is maximized in the internal combustion engine 102 (power 204 is maximized at 85%, as shown in FIG. 2A, and 85% of the 3,600 RPM maximum engine RPM for the internal combustion engine 102 is 3,060 RPM). Higher windings and maximum RPMs for the motor 104 may bring the limited maximum motor RPM for maximal power in the motor 104 closer to the maximum engine RPM for maximal power in the internal combustion engine 102. As shown in FIG. 2E, the torque 226B and power 222B are increased compared to the shown percentages of 3,600 RPM, but limited by the control electronics 160 to a limited maximum motor RPM that is approximately the same as, such as within five percent (5%) of, the maximum engine RPM of 3,600 RPM. The limited maximum motor RPM may be at least five percent (5%) lower than the non-limited motor maximum RPM, and/or the non-limited motor maximum RPM may be at least five percent (5%) greater than the maximum engine RPM.

Figure 2F:
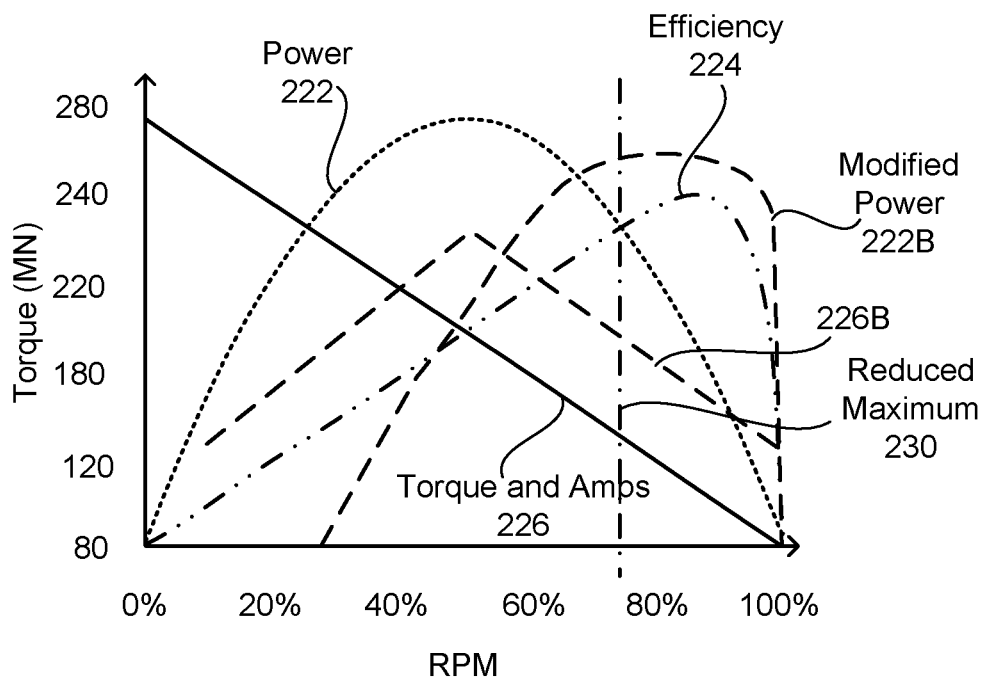
FIG. 2F is a graph showing a combination of the first, second and third modifications to power, torque, and efficiency as functions of RPM in the motor of FIG. 1B.

FIG. 2F is a graph showing all three modifications being performed simultaneously. In FIG. 2F, power 222, 222B, torque 226, 226B, and efficiency 224 are functions of RPM in the battery-powered motor of FIG. 1B according to an example embodiment in which the maximum power and torque are reduced, and power 222B and torque 226B are reduced at lower RPM, to simulate performance of the internal combustion engine 102. In this example, the windings or coils 154 have been increased to increase the non-limited maximum motor RPM of the motor 104, the control electronics 160 limits the limited maximum motor RPM of the motor 104 as in FIGS. 2D and 2E, and the control electronics 160 has reduced the power 222B and torque 226B at low RPM as discussed above with respect to FIG. 2C, to simulate the performance characteristics of the internal combustion engine 102.

Figure 2G:
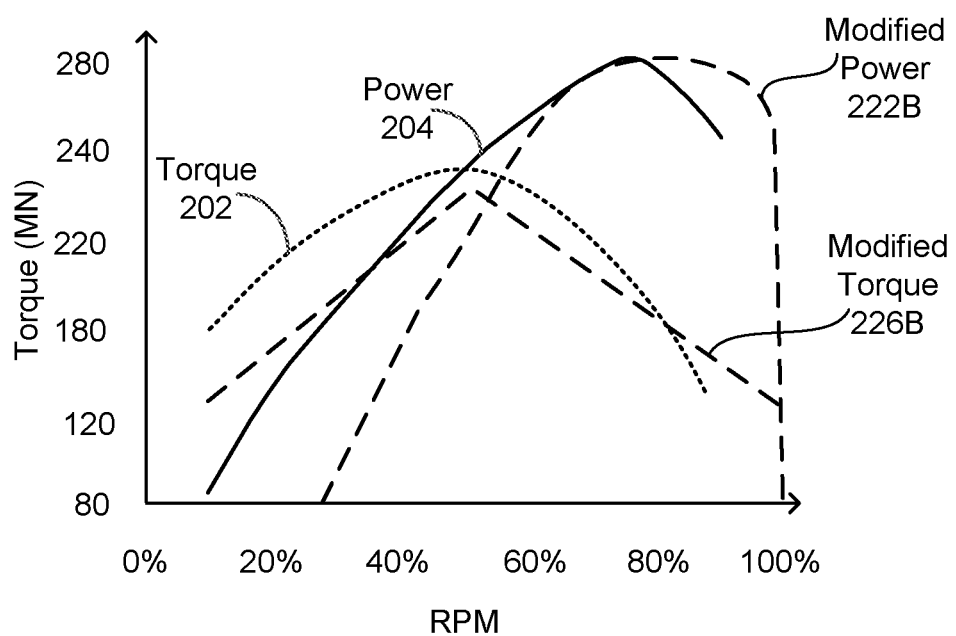
FIG. 2G is a graph showing the modified power of the motor as shown in FIG. 2F, the modified torque of the motor as shown in FIG. 2F, the power of the engine as shown in FIG. 2A, and the torque of the engine as shown in FIG. 2A.

FIG. 2G is a graph showing the modified power 222B of the motor 104 as shown in FIG. 2F, the modified torque 226B of the motor as shown in FIG. 2F, the power 204 of the engine 102 as shown in FIG. 2A, and the torque 202 of the engine 102 as shown in FIG. 2A. As can be seen in FIG. 2G the power and torque curves of the modified power 222B and modified torque 226B more closely match the corresponding power and torque curves of the power 204 and torque 202 of the internal combustion engine 102, which this motor 104 is intended to replace. In addition, the efficiency curve 224 (shown in FIGS. 2C, 2D, 2E, and 2F) of the motor 104 may also shift to a new operating point thereby, increasing the run time of the motor 104 off of the battery packs 106A, 106B.

In another implementation, the motor performance may be modified mechanically using throttle controls with mechanical elements such as cams and/or slack springs. As discussed above with respect to FIGS. 1A and 1C, the machine 100 may include a throttle 103 that controls power output and torque generated by the internal combustion engine 102 or battery-powered motor 104. The throttle 103 may control the power output and torque generated by the internal combustion engine 102 by controlling an amount of gasoline fed into the internal combustion engine 102. The throttle 103 may control the power output and torque generated by the battery-powered motor 104 by providing input to a speed control unit 166 of the control electronics 160, prompting the control electronics 160 to modify the output of the brushless motor control circuit 168 by changing an amount of current flowing through the coils 154. FIGS. 3A, 3B, 3C, and 3D show example throttle controls with differently shaped cams that provide input to the control electronics 160 and modify the torque response to the position of the throttle 103. FIG. 4 shows the torque as a function of the position of the throttle 103 for the cams shown in FIGS. 3A, 3B, 3C, and 3D.

Figure 3A:
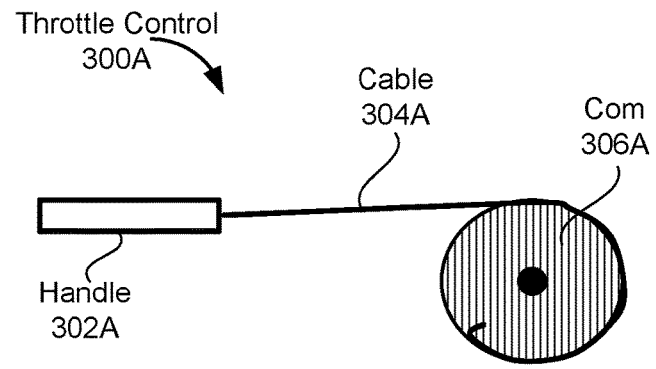
FIG. 3A shows a throttle control according to an example embodiment.
Figure 4:
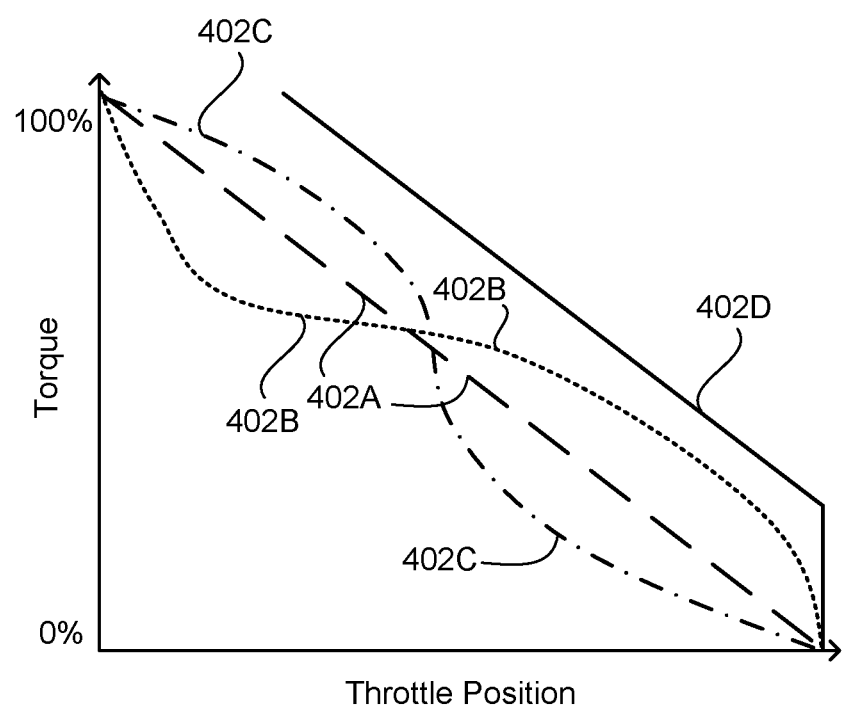
FIG. 4 is a graph showing torque as a function of throttle position for the throttle controls of FIGS. 3A, 3B, 3C, and 3D according to example embodiments.

FIG. 3A shows a throttle control 300A according to an example embodiment. The throttle control 300A may be an example of the throttle 103 shown in FIGS. 1A and 1C. The throttle control 300A may include a handle 302A coupled to a cam 306A by a cable 304A. In this example, the cam 306A is circular.

Figure 3B:
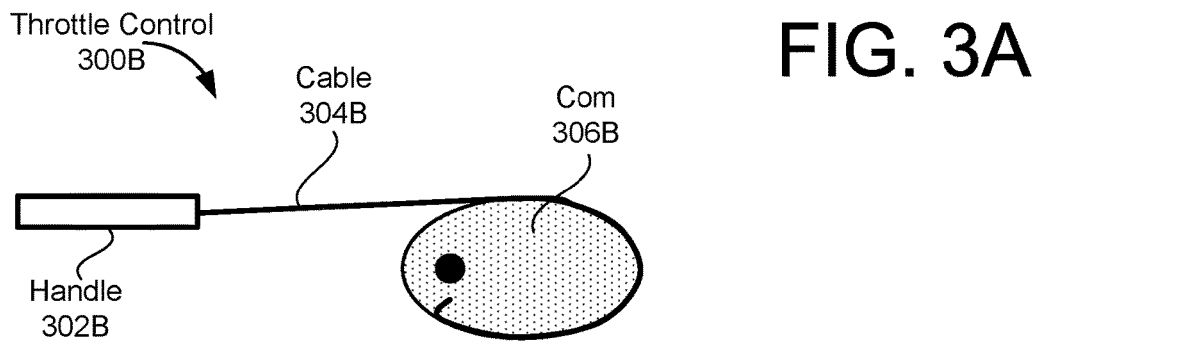
FIG. 3B shows a throttle control according to another example embodiment.

FIG. 3B shows a throttle control 300B according to another example embodiment. The throttle control 300B may be an example of the throttle 103 shown in FIGS. 1A and 1C. The throttle control 300B may include a handle 302B coupled to a cam 306B by a cable 304B. In this example, the cam 306B is oval-shaped. When the throttle control 300B is in a resting position, with no pressure applied by a user or operator of the machine 100, the cable 304B may extend around the oval-shaped cam 306B on both long sides of the cam 306B and only one short side of the cam 306B.

Figure 3C:
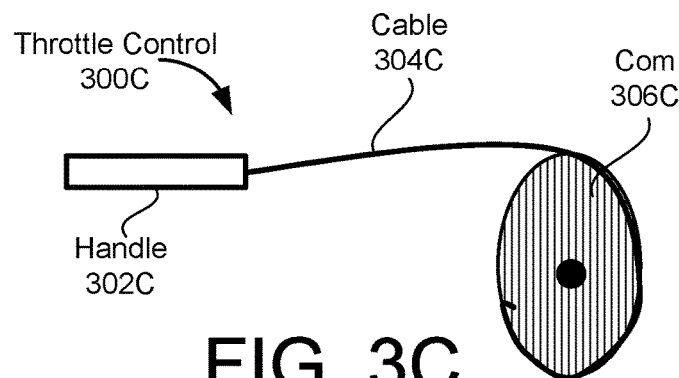
FIG. 3C shows a throttle control according to another example embodiment.

FIG. 3C shows a throttle control 300C according to another example embodiment. The throttle control 300C may be an example of the throttle 103 shown in FIGS. 1A and 1C. The throttle control 300C may include a handle 302C coupled to a cam 306C by a cable 304C. In this example, the cam 306C is oval-shaped. When the throttle control 300C is in a resting position, with no pressure applied by a user or operator of the machine 100, the cable 304C may extend around the oval-shaped cam 306C on both short sides of the cam 306C and only one long side of the cam 306C.

Figure 3D:
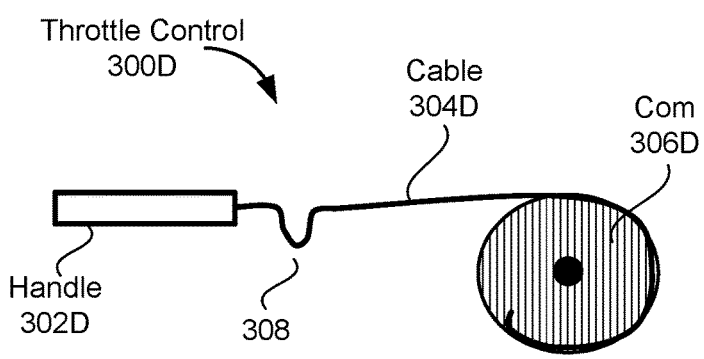
FIG. 3D shows a throttle control according to another example embodiment.

FIG. 3D shows a throttle control 300D according to another example embodiment. The throttle control 300D may be an example of the throttle 103 shown in FIGS. 1A and 1C. The throttle control 300D may include a handle 302D coupled to a cam 306D by a cable 304D. In this example, the cam 306D is circular. Also in this example, the cable 304D includes a slack portion 308, which may include a spring and/or coil of wire. The slack 308 may cause the cam 306D to remain stationary during a first portion of a range movement of the handle 302D, and then rotate in accordance with the shape of the cam 306D. The rotation may be a linear response to movement of the handle 302D as with the circular cam 306A of FIG. 3A, or, if the cam 306D is oval-shaped, a non-linear response to movement of the handle 302D, as FIG. 4 shows for the oval-shaped cams 306B, 306C. The first portion, during which the cam 306D remains stationary and the throttle control 300D does not provide any input to the motor 104 and/or control electronics 160, may be between five percent (5%) and twenty-five percent (25%) of the range of movement of the cable 304D and/or handle 302D.

FIG. 4 is a graph showing torque 402A, 402B, 402C, 402D as a function of throttle position for the throttles 300A, 300B, 300C, 300D of FIGS. 3A, 3B, 3C, and 3D according to example embodiments. The circular cam 306A of the throttle 300A causes the torque 402A of the throttle 300A to decrease linearly in response to movement of the handle 302A and rotation of the cam 306A. The oval-shaped cam 306B of the throttle 300B causes the torque 402B of the throttle 300B to initially decrease quickly in response to movement of the handle 302B and rotation of the cam 306B, and then decrease more slowly. The oval-shaped cam 306C of the throttle 300C causes the torque 402C of the throttle 300C to initially decrease slowly in response to movement of the handle 302C, and then decrease more quickly. The slack 308 in the cable 304D of the throttle control 300D causes the torque 402D of the throttle control 300D to not respond to an initial movement of the handle 302D over a first portion of the range of motion of the throttle control 300D, and, based on the circular cam 306D, decrease linearly in response to movement of the handle 302D until reaching a minimum torque value.

Figure 5A:
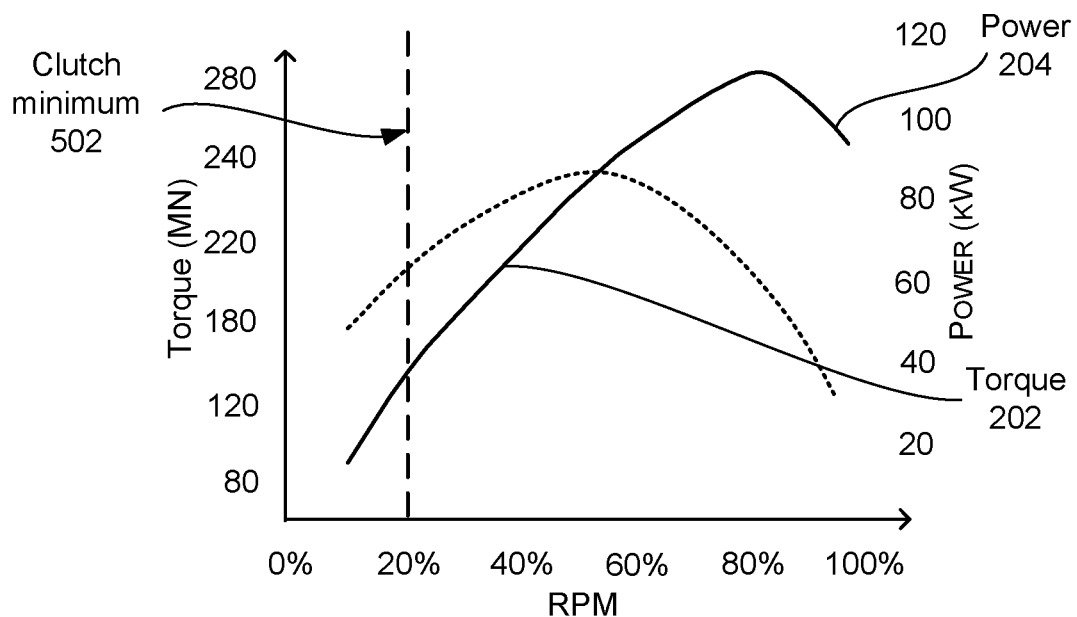
FIG. 5A is a graph showing power and torque as functions of RPM in the internal combustion engine of FIG. 1A to reflect a point at which a clutch disengages according to an example embodiment.

Many machines powered by an internal combustion engine include a mechanical clutch that decouples the tool transmission from the output of the engine at low engine speeds. For example, FIG. 5A is a graph showing power 204 and torque 202 as functions of RPM in the internal combustion engine 102 of FIG. 1A with a minimum RPM value to reflect a point at which a clutch disengages the engine according to an example embodiment. In an example of a hydraulic system, such as a pressure washer or hydraulic demolition hammer, the machine 100 may decouple the internal combustion engine 102 from the machine 100 at low RPM and/or when the hydraulic pressure is low, and/or that the machine 100 is in a low hydraulic pressure condition. The clutch minimum 502 shows the RPM value below which the machine 100 may decouple the internal combustion engine 102 from the machine 100. The decoupling may reduce the internal combustion engine 102 to an idling state, allowing the internal combustion engine to rotate with very little load and thereby avoid stalling.

Figure 5B:
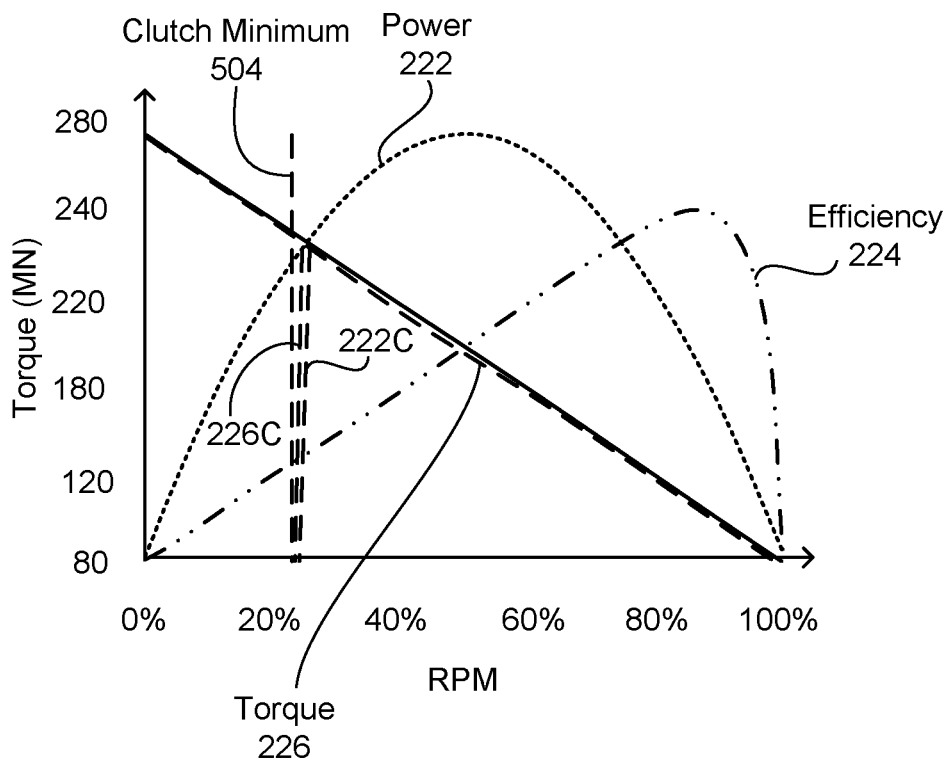
FIG. 5B is a graph showing power, torque, and efficiency in the motor of FIG. 1B according to an example embodiment to reflect when a clutch disengages.

In the system 105 of the present disclosure, it may be desirable to reduce depletion of the battery packs 106A, 106B when the clutch decouples the motor output shaft or spindle 114 from the machine 100 at low motor speeds. FIG. 5B is a graph showing power 222, torque 226, and efficiency 224 in the motor 104 of FIG. 1B according to an example embodiment in which power is delivered to the motor 104 when the clutch engages and power delivered to the motor is interrupted when the clutch disengages, creating a clutch minimum 504 power 222C and torque 226C. This reduces battery pack depletion, increasing the runtime of the system 105. In an example embodiment, the control electronics 160 may turn the motor 104 off below the clutch minimum 504, obviating the need for a physical clutch.

Figure 5C:
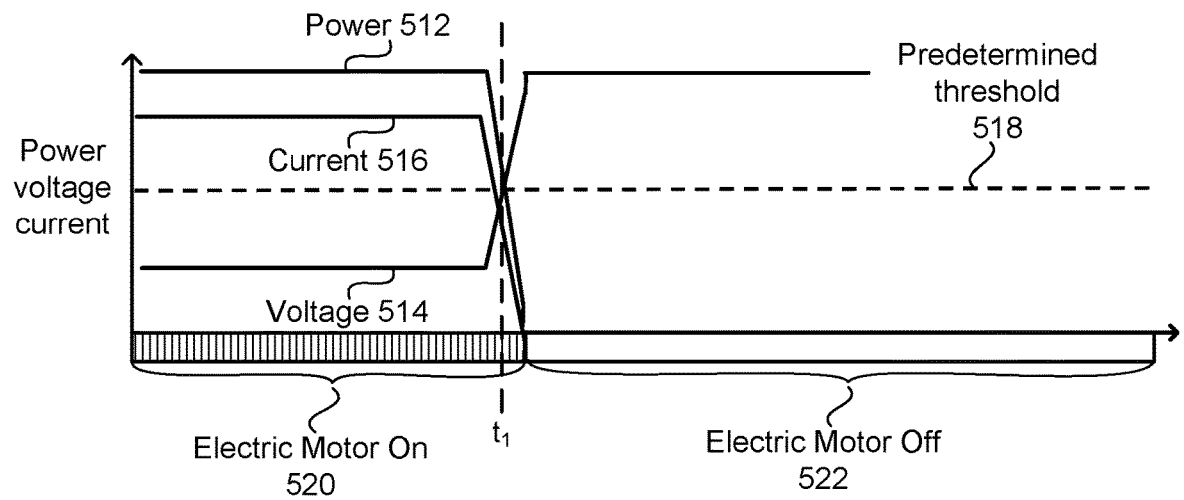
FIG. 5C is a graph showing current, voltage, and power in the battery-powered motor according to an example embodiment in which the battery-powered motor reduces power when hydraulic pressure is low.

Referring to FIG. 5C, in this embodiment, the control electronics 160 may indirectly sense that the clutch has decoupled. For example, at time t1, the control electronics 160 may indirectly sense that the clutch has decoupled by sensing a drop in current 516 or power 512 below a threshold 518 or an increase in voltage 514 above the threshold 518. Alternatively, the control electronics 160 may determine the rate of change or another function of one or more of these parameters. Upon sensing that the clutch has decoupled, the control electronics 160 may, at $t_1$, turn the motor 104 off, transitioning the motor 104 from a motor on 520 state to a motor off 522 state.

In another embodiment, it may be desirable to reduce, but not interrupt, power delivery to the motor upon sensing a certain condition. For example, when the system 105 is being used to power a hydraulic tool, such as a jack hammer, concrete saw, core drill, or tampler, it may be desirable to reduce power to the motor 104 when the hydraulic pressure is low, and/or that the machine 100 is in a low hydraulic pressure condition, indicating that the tool is not in active use. The control electronics 160 may determine when current and/or hydraulic pressure are low. The control electronics 160 may receive as input, for example, a signal from a pressure transducer indicating the hydraulic pressure and/or a drop in hydraulic pressure. Alternative, the control electronics 160 can sense a drop in current or power below a threshold value or an increase in voltage above a threshold value to sense when hydraulic pressure is low, and/or that the machine 100 is in a low hydraulic pressure condition, such that there is no load on the tool. When this occurs, the control electronics 160 turns off or reduces power delivered to the motor 104.

Figure 6:
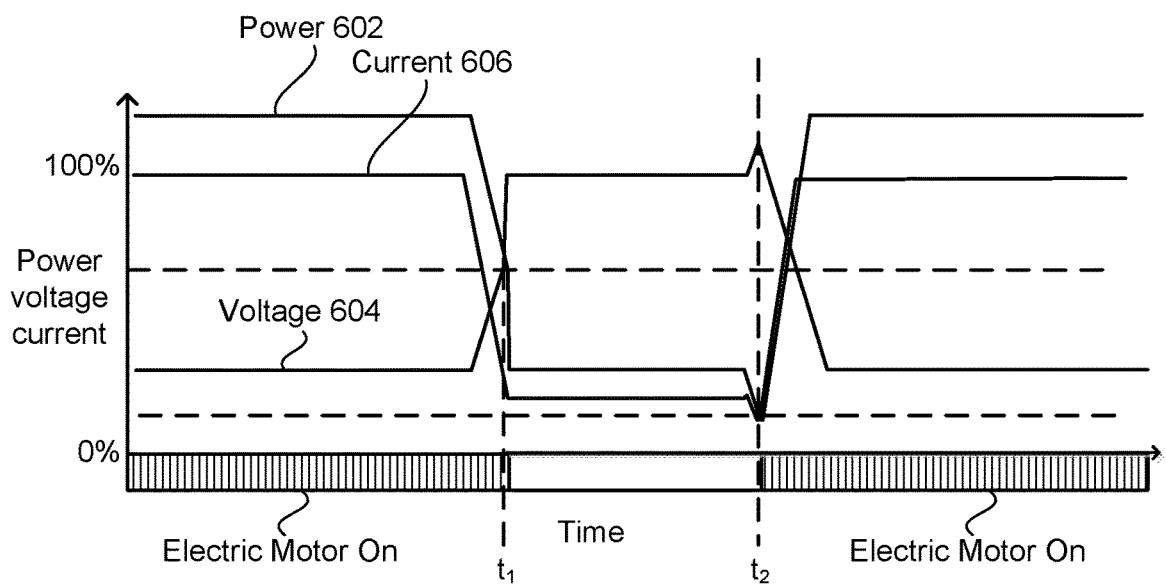
FIG. 6 is a graph showing current, voltage, and power in the battery-powered motor according to an example embodiment in which the battery-powered motor enters a low power mode when hydraulic pressure is low.

FIG. 6 is a graph showing current 606, voltage 604, and power 602 in the battery-powered motor 104 according to an example embodiment in which the battery-powered motor 104 reduces power when hydraulic pressure is low, and/or that the machine 100 is in a low hydraulic pressure condition. In this example, the control electronics 160 may cause the motor 104 to be on (510) when detected hydraulic pressure, such as in a jack hammer, is at least a threshold value, the threshold value being greater than zero or equal to zero. In this on state 608, the power 602 and current 606 may be high, and the voltage 604 may be low. At time t1, when the hydraulic pressure, power 602, and/or current 606 drop below the non-limited threshold value or the voltage 604 increases above a threshold value, the control electronics 160 may reduce the power delivered to the motor 104 so that the motor 104 continues to run at a low speed in a "watch mode" 610. Next, at time t2, the control electronics 160 may sense a further drop in current and/or power to a second, lower threshold value that indicates that the user is again starting to actively use the tool. At this time, the control electronics increases the power delivered to the motor back to the full ON state 612.

In another embodiment, at times, components of the machine 100, such as blades, may stall, such as when the components collide with an object such as a rock. In an example implementation, the control electronics 160 may detect when the rotating components stall, and may automatically or with the operators input reverse the direction of the components, freeing the components, and then return the direction to the original direction of the components.

Figure 7:
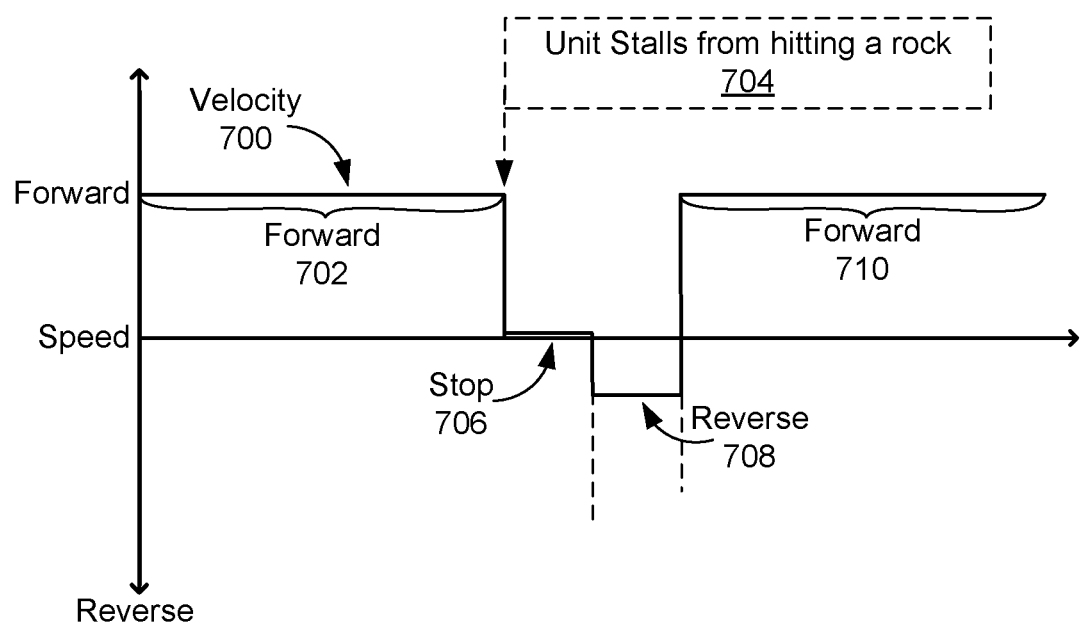
FIG. 7 is a graph showing changes in rotational speed of the motor of FIG. 1B in an example in which the motor stops and changes direction in response to the motor stalling.

FIG. 7 is a graph showing changes in rotational velocity 700 in an example in which the battery-powered motor 104 stops and changes direction in response to the battery-powered motor 104 stalling. In this example, the components, such as blades, may begin with a positive rotational velocity 700. Upon colliding with an object such as a rock (704), the rotating components may stall (706), meaning the speed of the components drops to zero. The control electronics 160 may detect the stall, and reverse (708) the direction of rotation of the motor and rotating components. After a non-limited time in reverse operation (708), the components may be assumed not to be obstructed by the object(s) any more, and the control electronics 160 or operator input may cause the components to resume the forward (710) direction, causing the rotational velocity 700 to again be greater than zero and in the forward direction.

Figure 8A:
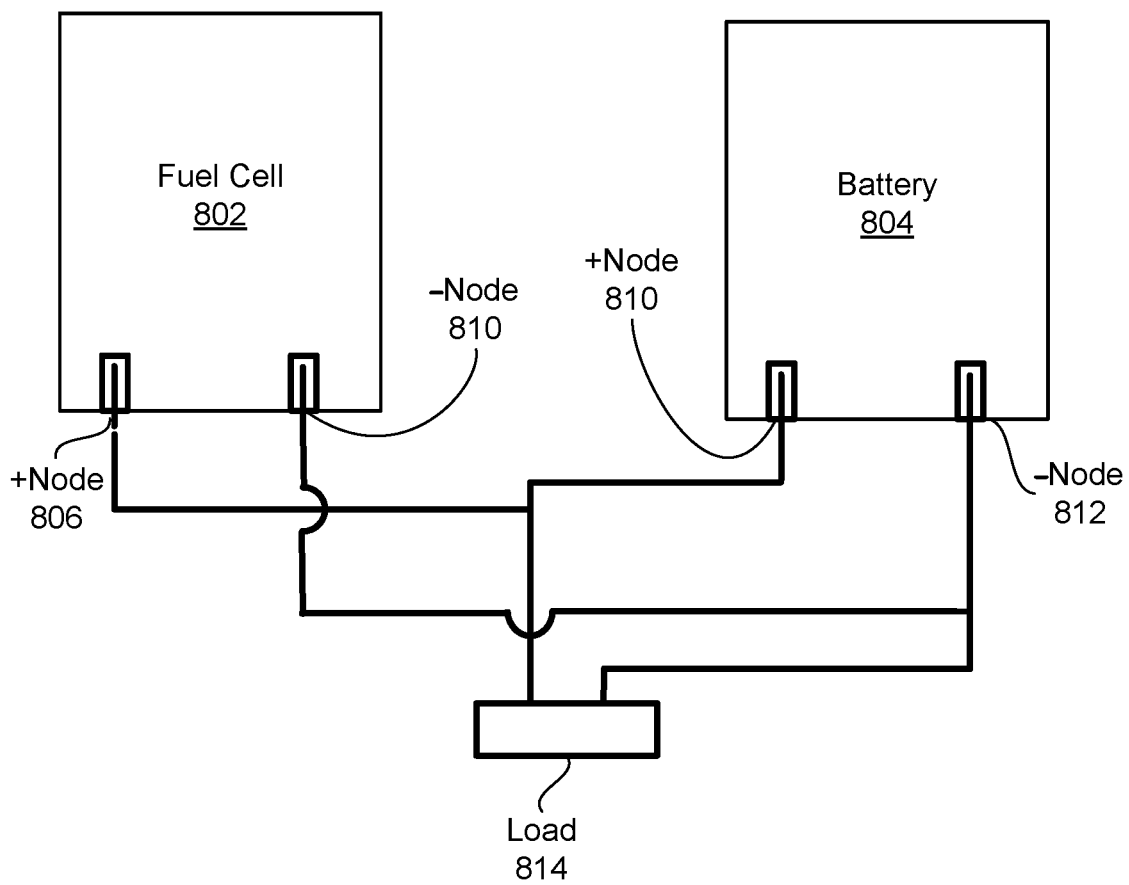
FIG. 8A shows a fuel cell and a battery included in the battery-powered motor according to an example embodiment.

Referring to FIG. 8A, in another embodiment, a fuel cell 800 and a battery pack 804 may be used to power the motor 104. The fuel cell 802 may take the place of the battery pack 106A on the motor 104 shown in FIG. 1B, and the battery pack 804 may be an example of the battery pack 106B. The battery pack 804 may be a rechargeable battery, such as a lithium-ion battery. The fuel cell 802 and battery pack 804 may be coupled in parallel to a load 814, which may be the motor 102, rotor 130, and/or control electronics 160. A positive node 806 of the fuel cell 802 may be coupled to a positive node 810 of the battery pack 804, and a negative node 808 of the fuel cell 802 may be coupled to a negative node 812 of the battery pack 804. The fuel cell 802 may supply a constant amount of energy and/or power to the battery pack 804, and the battery pack 804 may supply energy and/or power to the load 814 and/or motor 104. The fuel cell 802 may recharge, and/or maintain the charge of, the battery pack 804. In an example embodiment, the fuel cell 802 may recharge the battery pack 804, and/or provide power to the load, when a voltage of the battery falls below a threshold value such as one hundred percent (100%).

The fuel cell 802 may supply energy and/or power to the battery pack 804 by converting fuel to electrical energy. The fuel included in the fuel cell 802 may include gasoline, diesel, or hydrogen, as non-limiting examples. A user or operator of the machine 100 could refuel the fuel cell 802 by adding fuel to a storage unit in a similar manner to adding gasoline to an internal combustion engine. The fuel cell 802 may operate, providing energy and/or power to the battery pack 804, in response to an instruction from the control electronics 160. The control electronics 160 may instruct the fuel cell 802 to provide energy and/or power to the battery pack 804 when the motor 104 and/or power generated by the motor 104 meets or exceeds a threshold, the threshold being greater than zero (and may be measured in Watts). The control electronics 160 may instruct the fuel cell 802 to stop providing energy and/or power to the battery pack 804 when the motor 104 and/or power generated by the motor 104 falls below the threshold, and the fuel cell 802 may respond to the instruction by stopping providing energy and/or power to the battery pack 804.

Figure 8B:
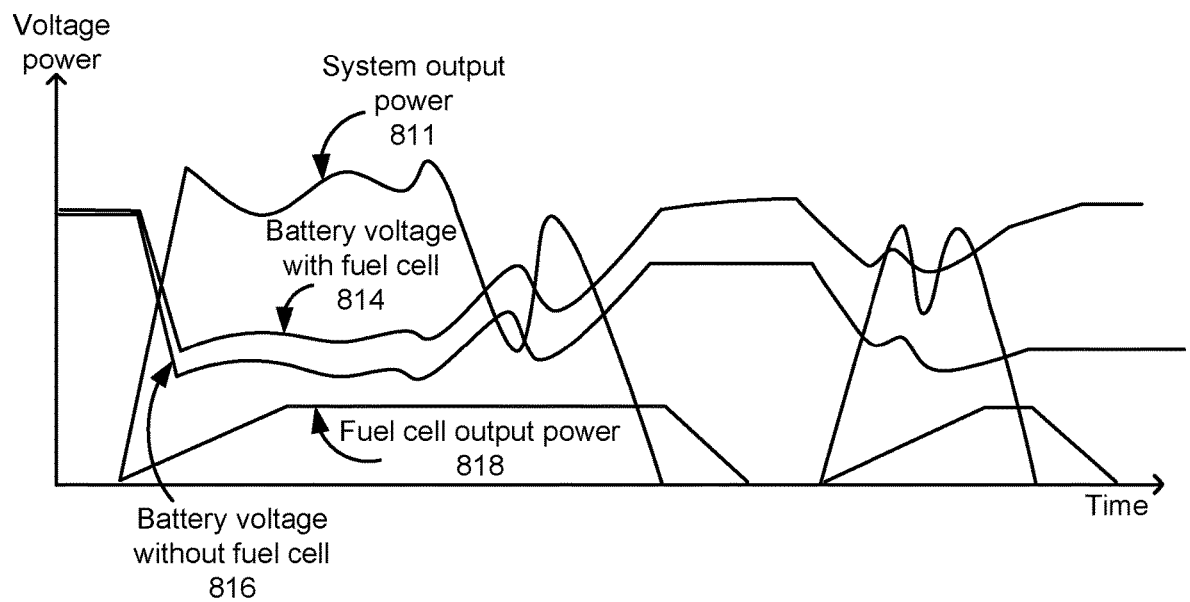
FIG. 8B is a graph showing voltage and power as functions of time in the battery-powered motor of FIG. 8A in an example in which the fuel cell runs when power is being provided to the motor.

FIG. 8B is a graph showing voltage and power as function of times in the battery-powered motor of FIG. 8A in an example in which the fuel cell 802 runs when power is being provided to the motor 104. In this, "drop on electric motor, battery fuel cell engine" example, the control electronics 160 may instruct the fuel cell 802 to run only when power is being provided to the motor 104. Power may be provided to the motor 104 when a user or operator of the machine 100 demands a load, such as when the user or operator turns the machine 100 on. When there is no load on the machine 100, such as when the user or operator turns the machine 100 off, the fuel cell 802 may ramp down and shut off. The rate of ramping down may be a function of the thermal performance of the fuel cell 802, as the ramping up of the fuel cell 802 may be a function of the thermal performance of the fuel cell when the fuel cell 802 is instructed by the control electronics 160 to produce electricity. As shown in FIG. 8B, the output power 818 generated by the fuel cell 802 lags the output power 811 of the system (which may be the machine 100 and/or motor 104).

Figure 8C:
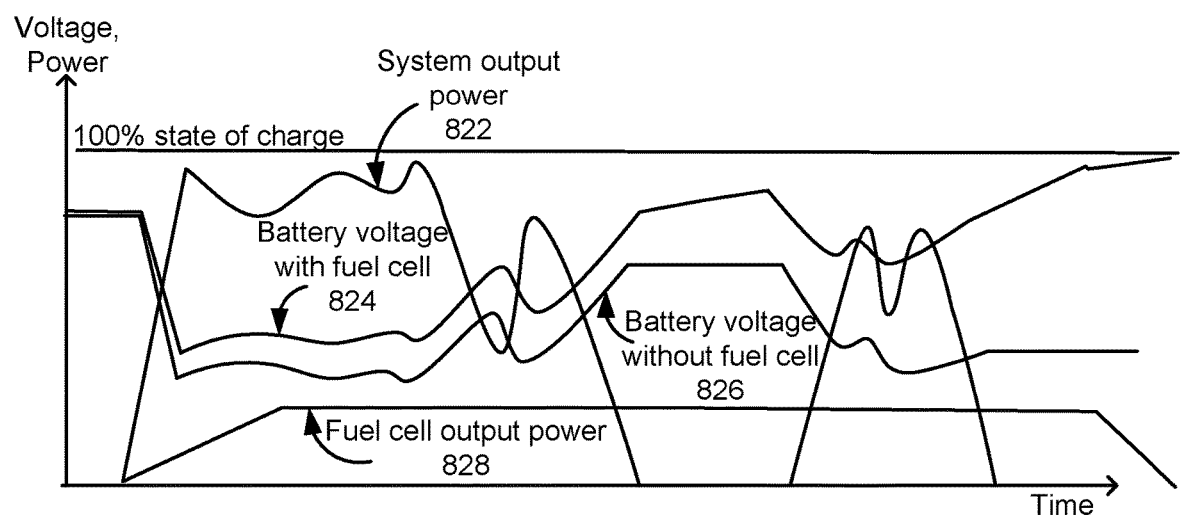
FIG. 8C is a graph showing voltage and power as functions of time in the battery-powered motor of FIG. 8A in an example in which the fuel cell runs when a voltage of the battery is below a maximum state of charge.

FIG. 8C is a graph showing voltage and power as functions of time in the battery-powered motor of FIG. 8A in an example in which the fuel cell 802 runs when a voltage of the battery pack 804 is below a maximum state of charge. In this, "drop on electric motor, battery fuel cell engine" example, the control electronics 160 may instruct the fuel cell 802 to run only when a voltage of the battery pack 804 is below a maximum state of charge limit. In this example, the fuel cell 802 may run when the machine 100 is not drawing power, allowing the fuel cell 802 to recharge the battery pack 804. The recharging of the battery pack 804 by the fuel cell 802 when the machine 100 is not drawing power may increase the life of the battery pack 804 and reduce instances in which the user or operator needs to replace the battery pack 804 with a fully charged battery. As shown in FIG. 8C, the fuel cell 800 may still output power 828 even when the system (such as the machine 100) is not outputting power 822.

Figure 8D:
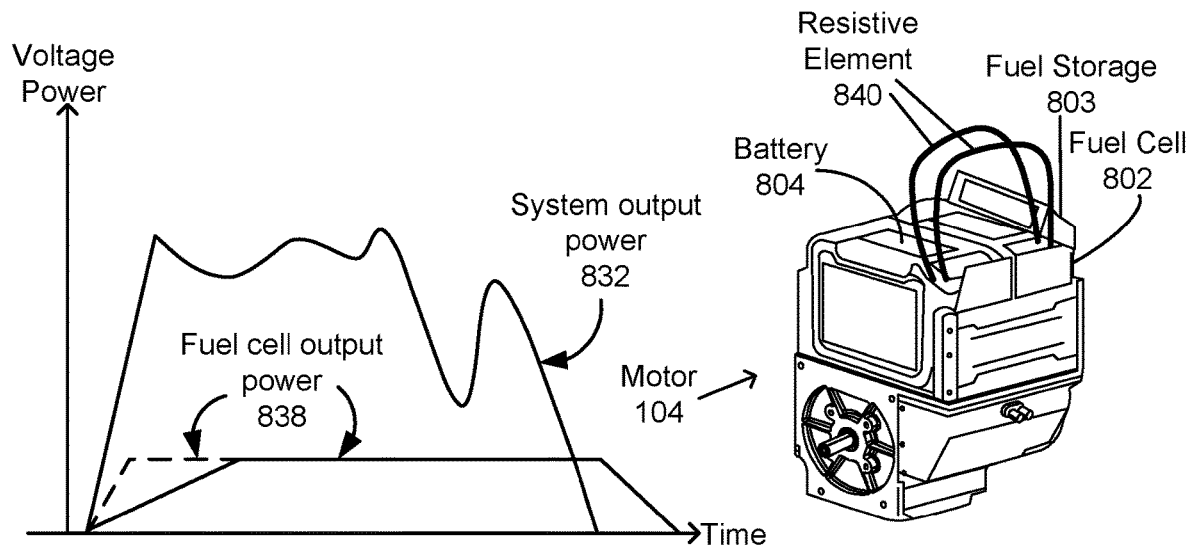
FIG. 8D is a graph showing voltage and power as functions of time in the battery-powered motor of FIG. 8A in an example in which the battery heats the fuel cell.

FIG. 8D is a graph showing voltage and power as a function of time in the battery-powered motor of FIG. 8A in an example in which the battery pack 804 heats the fuel cell. Performance of the fuel cell 802 may be related to the thermal performance and temperature of the fuel cell 802. To increase a rate at which the fuel cell 802 can provide high or full power, the battery pack 804 may supply energy to the fuel cell 802 in a form of heat, such as through a heating element such as a resistive coil or resistive element 840. The providing of the heat to the fuel cell 802 by the battery pack 804 may heat the fuel cell 802, increasing a rate at which the fuel cell 802 can achieve high and/or full power. As shown by the dashed lines of FIG. 8D, the fuel cell 802 achieves high and/or full power 838 more quickly when heated by the battery pack 804 than when not heated by the battery pack 804 (as shown in FIGS. 8B and 8C).

Figure 8E:
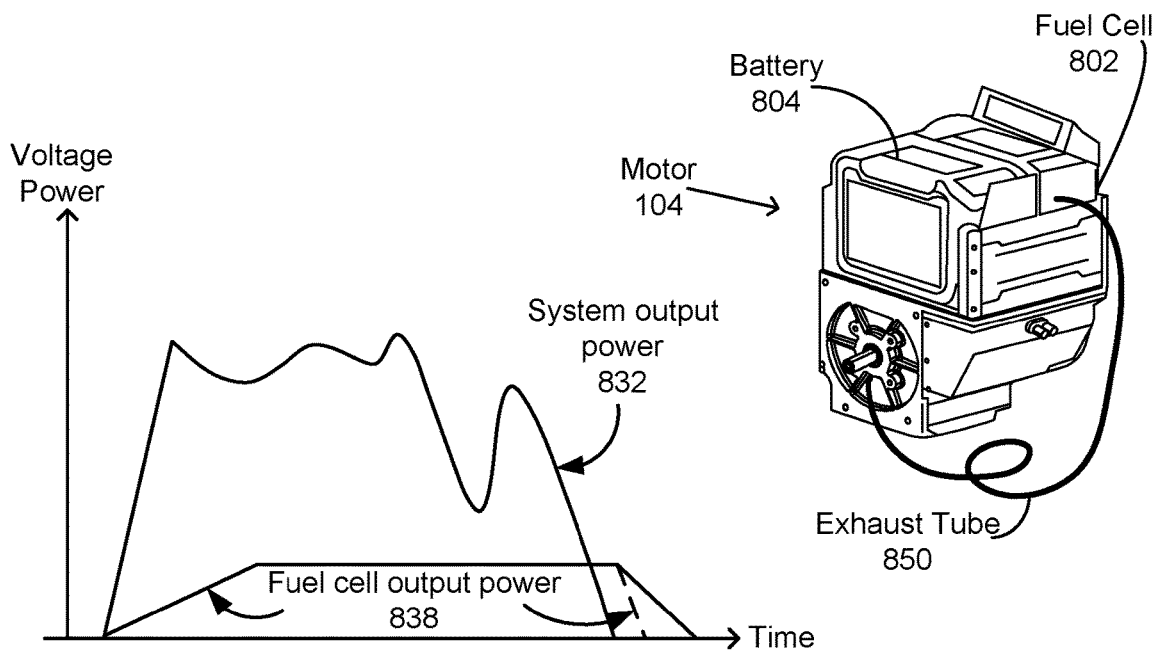
FIG. 8E is a graph showing voltage and power as functions of time in the battery-powered motor of FIG. 8A in an example in which exhaust air cools the fuel cell.

FIG. 8E is a graph showing voltage and power as functions of time in the battery-powered motor of FIG. 8A in an example in which exhaust air cools the fuel cell 802. The rate at which the fuel cell 802 can stop providing electrical energy and/or power to the battery pack 804 may be a function of how fast the fuel cell 802 can cool down. In an example embodiment, exhaust air used to cool the motor 104 inside the, "drop on battery, motor, fuel cell engine," may be used to cool the fuel cell 802 (which may be at a much higher temperature than the exhaust air), and may travel from the motor 104 to the fuel cell 802 via a conduit such as an exhaust tube 850. As shown by the dashed line in FIG. 8E, the output power 848 of the fuel cell 802 drops more rapidly when the fuel cell 802 is cooled by the exhaust air than when the fuel cell 802 is not cooled by the exhaust air (as shown in FIGS. 8B and 8C). In an example embodiment, machine 100 may be decoupled from the motor 104 so that only the fan is spinning, providing air to the fuel cell 802 to cool the fuel cell down.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A battery-powered motor comprising:
   an electric motor that is wound to enable the motor to achieve a non-limited maximum motor speed for at least one specified battery, the motor operable over a motor speed range up to the non-limited maximum motor speed;
   a controller configured to control current flowing from the at least one specified battery to the electric motor, including:
      limiting current to the electric motor in a lower portion of the motor speed range; and
      limiting the current to prevent the electric motor speed from exceeding a limited maximum motor speed, the limited maximum motor speed being lower than the non-limited maximum motor speed; and
   a housing enclosing the electric motor and the controller and the at least one specified battery, the housing having a form factor configured to engage with a machine to replace an internal combustion engine that has a maximum engine speed that is approximately the same as the limited maximum motor speed.

2. The battery-powered motor of claim 1, wherein limiting current to the electric motor in the lower portion of the motor speed range comprises reducing current to the electric motor for at least a lowest ten percent (10%) of the motor speed range.

3. The battery-powered motor of claim 1, wherein the maximum engine speed is within five percent (5%) of the limited maximum motor speed.

4. The battery-powered motor of claim 1, wherein the limited maximum motor speed is at least five percent (5%) lower than the non-limited maximum motor speed.

5. The battery-powered motor of claim 1, wherein the non-limited motor maximum speed is at least five percent (5%) greater than the maximum engine speed.

6. The battery-powered motor of claim 1, wherein the form factor of the housing is configured to receive the at least one specified battery.

7. The battery-powered motor of claim 1, wherein the form factor of the housing is configured to receive the at least one specified battery and a fuel cell.

8. The battery-powered motor of claim 1, wherein the at least one specified battery and a fuel cell are configured to be coupled to the electric motor in parallel.

9. The battery-powered motor of claim 1, further comprising the at least one specified battery.

10. The battery-powered motor of claim 1, wherein:
   the at least one specified battery comprises a rechargeable battery coupled to the electric motor;
   a fuel cell is coupled to the electric motor in parallel with the rechargeable battery; and
   the controller is configured to control current flowing from the rechargeable battery and the fuel cell to the electric motor such that the fuel cell is operable to maintain or increase a state of charge of the battery while the battery is powering the motor.

11. The electric motor of claim 1, wherein the form factor is substantially similar to a form factor of the internal combustion engine that the electric motor replaces.

12. The electric motor of claim 1, wherein limiting current to the electric motor in the lower portion of the motor speed range comprises reducing current to the electric motor for at least a lowest twenty-five percent (25%) of the motor speed range.

13. The battery powered motor of claim 1, further comprising:
   a throttle control configured to provide input to the electric motor, the throttle control comprising a cable with slack, the slack being configured to cause the throttle to provide no input to the electric motor during a first portion of a range of motion of the throttle.

14. The battery-powered motor of claim 13, wherein the first portion is between five percent (5%) and twenty-five percent (25%) of the range of motion of the throttle.

15. The battery-powered motor of claim 13, wherein the slack includes a spring.

16. The battery-powered motor of claim 13, wherein the throttle includes an oval-shaped cam, the cam providing input to the electric motor in response to the cam being rotated by movement of the cable.

17. The battery-powered motor of claim 13, wherein the throttle is configured to provide the input to the electric motor via a controller in a second portion of the range of motion of the throttle that is greater than the first portion.

* * * * *